United States Patent
Ogata

(10) Patent No.: US 10,684,802 B2
(45) Date of Patent: Jun. 16, 2020

(54) INFORMATION PROCESSING APPARATUS, PRINTER DRIVER, AND NON-TRANSITORY COMPUTER-READABLE STORAGE MEDIUM

(71) Applicant: Oki Data Corporation, Tokyo (JP)

(72) Inventor: Keiichi Ogata, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 16/165,203

(22) Filed: Oct. 19, 2018

(65) Prior Publication Data

US 2019/0129659 A1 May 2, 2019

(30) Foreign Application Priority Data

Oct. 27, 2017 (JP) .................................. 2017-207987

(51) Int. Cl.
*G06F 3/12* (2006.01)

(52) U.S. Cl.
CPC .......... *G06F 3/1204* (2013.01); *G06F 3/1205* (2013.01); *G06F 3/1254* (2013.01); *G06F 3/1255* (2013.01); *G06F 3/1285* (2013.01); *G06F 3/1297* (2013.01)

(58) Field of Classification Search
CPC .... G06F 3/1204; G06F 3/1254; G06F 3/1255; G06F 3/1297
See application file for complete search history.

(56) References Cited

U.S. PATENT DOCUMENTS

| | | | |
|---|---|---|---|
| 6,473,811 B1* | 10/2002 | Onsen | H04N 1/00278 709/223 |
| 2010/0188680 A1* | 7/2010 | Xiao | G06F 3/1205 358/1.13 |
| 2010/0309499 A1* | 12/2010 | Ebi | G06F 3/1205 358/1.13 |

FOREIGN PATENT DOCUMENTS

JP   2004-227390 A   8/2004

* cited by examiner

*Primary Examiner* — Moustapha Diaby
(74) *Attorney, Agent, or Firm* — Metrolex IP Law Group, PLLC

(57) ABSTRACT

An information processing apparatus according an embodiment includes: a storing unit capable of storing one or more setting information each of which is set for executing image formation processing, wherein each setting information is associated with and stored with first apparatus information indicating a first configuration of the image formation apparatus for the corresponding setting information, the storing unit further being capable of storing second apparatus information indicating a second configuration of the image formation apparatus, which is a latest configuration of the image formation apparatus; and a processing unit that, when receiving an instruction to select one of the one or more setting information as actual setting, compares the first apparatus information associated with the selected setting information and the second apparatus information, and determines, based on the comparison result, to accept or reject to reflect the selected setting information to the actual setting.

13 Claims, 21 Drawing Sheets

FIG. 3

IOPT OPTION INFORMATION

| |
|---|
| NUMBER OF PAPER SUPPLY TRAYS |
| PRESENCE OR ABSENCE OF DUPLEX PRINTING UNIT |
| PRESENCE OR ABSENCE OF HARD DISK DRIVE |
| PRESENCE OR ABSENCE OF FINISHER DEVICE |
| PRESENCE OR ABSENCE OF PUNCH UNIT |
| PRINTING SETTING OF ENCRYPTION AUTHENTICATION PRINTING JOB |
| ⋮ |

FIG. 4

ISET SETTING INFORMATION

| |
|---|
| PAPER SIZE |
| PAPER SUPPLY METHOD |
| PAPER TYPE |
| PAPER THICKNESS |
| LAYOUT TYPE |
| DUPLEX PRINTING |
| DIRECTION OF PRINTING |
| COLOR OR MONOCHROME |
| TONER SAVING |
| ⋮ |

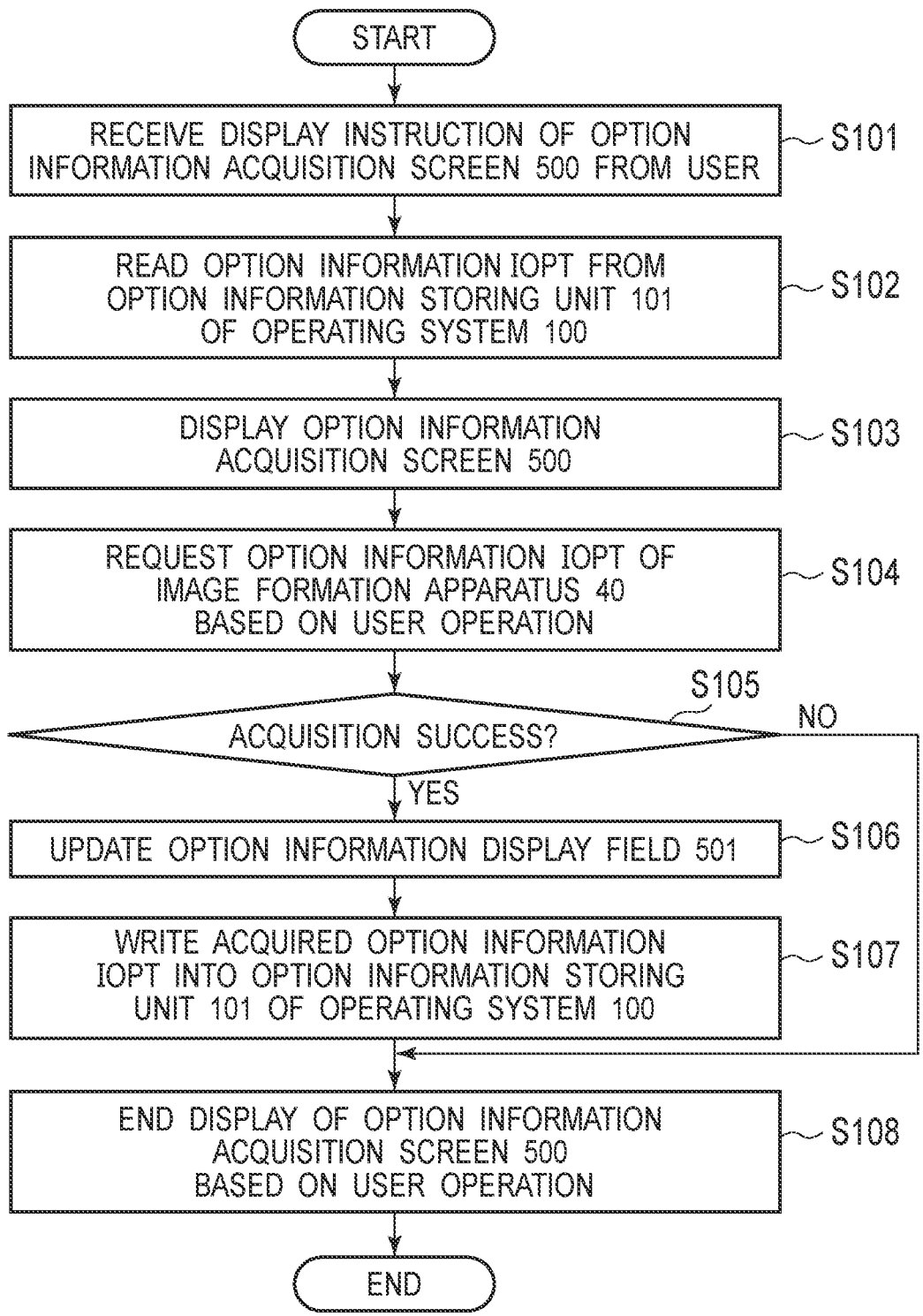

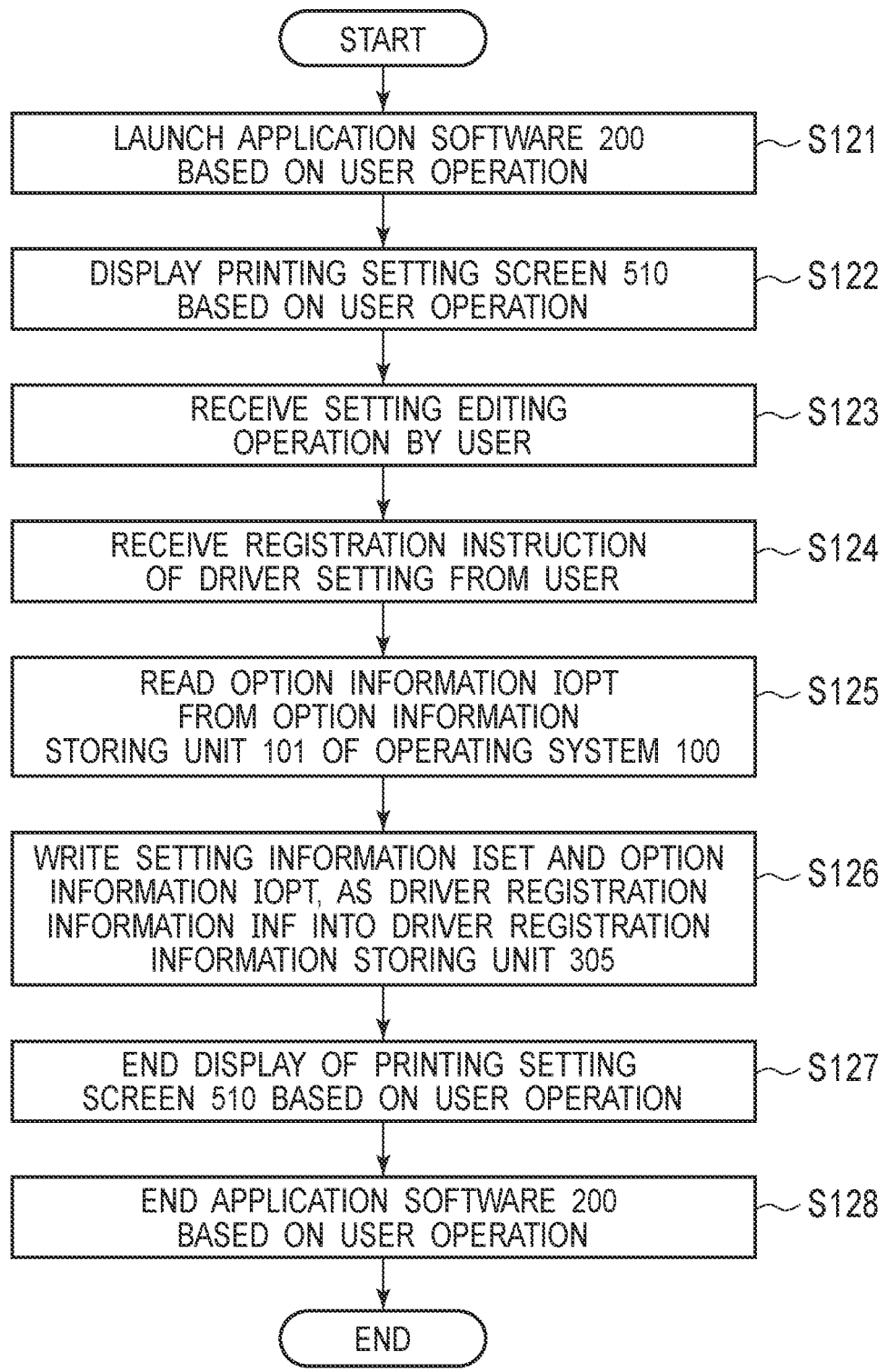

FIG. 8

PRINTING SETTING

| BASIC SETTING | DETAILED SETTING | OTHER SETTING |

DRIVER SETTING
- CURRENT SETTING ▼ — 511
- SETTING REGISTRATION... | SETTING MANAGEMENT... — 512, 513

510, 514

- PAPER SIZE: [A4 210 x 297 mm ▼]  ☐ COVERT PAPER SIZE
- PAPER SUPPLY METHOD: [AUTOMATIC SELECTION ▼]
- PAPER TYPE: [PRINTER SETTING ▼]
- PAPER THICKNESS: [PRINTER SETTING ▼]
- LAYOUT TYPE: [NORMAL PRINTING ▼]
- DUPLEX PRINTING: [NONE ▼]
- DIRECTION OF PRINTING: ● PORTRAIT  ☐ 180°   ○ LANDSCAPE  ☐ 180°
- COLOR/MONOCHROME SETTING: ● COLOR   ○ MONOCHROME
- TONER SAVING: [PRINTER SETTING ▼]

PAPER SUPPLY OPTION...
LAYOUT OPTION...

CURRENT COLOR SETTING : RECOMMENDED
COLOR / MONOCHROME OPTION...
☐ TONER IS NOT SAVED FOR 100% BLACK COLOR

VERSION INFORMATION...   RESTORE TO DEFAULT SETTING...

[OK]   [CANCEL]   [SUBMIT]   [HELP]
 515     516        517

FIG. 11

PRINTING SETTING

BASIC SETTING | DETAILED SETTING | OTHER SETTING

DRIVER SETTING: DEFAULT SETTING ▼ ...
511
511A — DEFAULT SETTING
CURRENT SETTING
A
B
C
D
E 510
514

PAPER SIZE: B5 182 x 257 mm ▼
☐ COVERT PAPER SIZE
PAPER SUPPLY METHOD: TRAY 2 ▼
PAPER TYPE: PRINTER SETTING ▼
PAPER THICKNESS: PRINTER SETTING ▼    PAPER SUPPLY OPTION... 
LAYOUT TYPE: NORMAL PRINTING ▼
DUPLEX PRINTING: NONE ▼    LAYOUT OPTION...
DIRECTION OF PRINTING: ● PORTRAIT ☐ 180°
                       ○ LANDSCAPE ☐ 180°
COLOR/MONOCHROME SETTING: ● COLOR    CURRENT COLOR SETTING: RECOMMENDED
                          ○ MONOCHROME  COLOR/MONOCHROME OPTION...
TONER SAVING: PRINTER SETTING ▼
☐ TONER IS NOT SAVED FOR 100% BLACK COLOR
VERSION INFORMATION...    RESTORE TO DEFAULT SETTING...

OK       CANCEL    SUBMIT    HELP
515      516       517

FIG. 13

PRINTING SETTING

| BASIC SETTING | DETAILED SETTING | OTHER SETTING |

DRIVER SETTINGS
CURRENT SETTING ▼
SETTING REGISTRATION... | SETTING MANAGEMENT...

PAPER SIZE: B5 182 x 257 mm ▼
☐ COVERT PAPER SIZE

PAPER SUPPLY METHOD: TRAY 2 ▼

PAPER TYPE: PRINTER SETTING ▼

PAPER THICKNESS: PRINTER SETTING ▼

PAPER SUPPLY OPTION...

LAYOUT OPTION... ▼

NOTICE
⚠ THIS DRIVER SETTING CANNOT BE USED BECAUSE OPTION INFORMATION IS UNMATCHED.
OK

CURRENT COLOR SETTING: RECOMMENDED
COLOR / MONOCHROME OPTION...

MONOCHROME SETTING ○ MONOCHROME    PRINTER SETTING ▼

TONER SAVING    ☐ TONER IS NOT SAVED FOR 100% BLACK COLOR

VERSION INFORMATION...    RESTORE TO DEFAULT SETTING...

OK    CANCEL    SUBMIT    HELP 510
530

PRINTING SETTING

BASIC SETTING | DETAILED SETTING | OTHER SETTING

DRIVER SETTING
DEFAULT SETTING ▼
- DEFAULT SETTING
- CURRENT SETTING
- A
- B
- C
- D
- E 511
511A

510 — 514

PAPER SIZE: [B5 182 x 257 mm ▼]
☐ COVERT PAPER SIZE

PAPER SUPPLY METHOD: [TRAY 2 ▼]

PAPER TYPE: [PRINTER SETTING ▼]

PAPER THICKNESS: [PRINTER SETTING ▼]

LAYOUT TYPE: [NORMAL PRINTING ▼] [PAPER SUPPLY OPTION...]

DUPLEX PRINTING: [NONE ▼] [LAYOUT OPTION...]

DIRECTION OF PRINTING: ◉ PORTRAIT  ☐ 180°
                       ○ LANDSCAPE ☐ 180°

COLOR/MONOCHROME SETTING: ◉ COLOR
                          ○ MONOCHROME

CURRENT COLOR SETTING: RECOMMENDED
[COLOR/MONOCHROME OPTION...]

TONER SAVING: [PRINTER SETTING ▼]
☐ TONER IS NOT SAVED FOR 100% BLACK COLOR

[VERSION INFORMATION...]  [RESTORE TO DEFAULT SETTING...]

[OK]   [CANCEL]   [SUBMIT]   [HELP]
 515    516        517

INFORMATION PROCESSING APPARATUS, PRINTER DRIVER, AND NON-TRANSITORY COMPUTER-READABLE STORAGE MEDIUM

CROSS REFERENCE TO RELATED APPLICATIONS

This application claims priority based on 35 USC 119 from prior Japanese Patent Application No. 2017-207987 filed on Oct. 27, 2017, entitled "INFORMATION PROCESSING APPARATUS, PRINTER DRIVER, AND NON-TRANSITORY COMPUTER-READABLE STORAGE MEDIUM", the entire contents of which are incorporated herein by reference.

BACKGROUND

The disclosure relates to an information processing apparatus that generates printing data, a printer driver that is installed on the information processing apparatus, and a non-transitory computer-readable storage medium on which a program of the printer driver is recorded.

An information processing apparatus typically generates printing data using a printer driver supporting an image formation apparatus. Some printer drivers allow driver setting that is set to be registered (for example, Patent Literature 1).

[Patent Literature 1] Japanese Laid-open Patent Publication No. 2004-227390

SUMMARY

Such an information processing apparatus is desired to offer greater convenience for a user, and expected to further improve the convenience.

It is desirable to provide an information processing apparatus, a printer driver, and a non-transitory computer-readable storage medium that can enhance the convenience for the user.

A first aspect is an information processing apparatus that includes: a storing unit being capable of storing therein one or more setting information each of which is set for executing image formation processing in an image formation apparatus, wherein each setting information is associated with and stored with first apparatus information indicating a first configuration of the image formation apparatus for the corresponding setting information, the storing unit further being capable of storing therein second apparatus information indicating a second configuration of the image formation apparatus, which is a latest configuration of the image formation apparatus acquired from the image formation apparatus; and a processing unit that, when receiving an instruction to select one of the stored one or more setting information as actual setting to be used for the image formation processing, compares the first apparatus information that is associated with the selected setting information and the second apparatus information, and determines, based on the comparison result, to accept or reject to reflect the selected setting information to the actual setting to be used.

A second aspect is an information processing method that includes: storing in the storing unit one or more setting information, each of which is set for executing image formation processing in an image formation apparatus, wherein each setting information is associated with and stored with first apparatus information indicating a first configuration of the image formation apparatus for the corresponding setting information; storing second apparatus information indicating a second configuration of the image formation apparatus, which is a latest configuration of the image formation apparatus acquired from the image formation apparatus; comparing, when an instruction to select one of the stored one or more setting information as actual setting to be used for the image formation processing, the first apparatus information that is associated with the selected setting information and the second apparatus information; and determining, based on the comparison result, to accept or reject to reflect the selected setting information to the actual setting to be used.

A third aspect is a non-transitory computer-readable storage medium that stores a program of a printer driver, the program executed by a processor to cause the processor to perform operation comprising: storing in the storing unit one or more setting information, each of which is set for executing image formation processing in an image formation apparatus, wherein each setting information is associated with and stored with first apparatus information indicating a first configuration of the image formation apparatus for the corresponding setting information; storing second apparatus information indicating a second configuration of the image formation apparatus, which is a latest configuration of the image formation apparatus acquired from the image formation apparatus; comparing, when an instruction to select one of the stored one or more setting information as actual setting to be used for the image formation processing, the first apparatus information that is associated with the selected setting information and the second apparatus information; and determining, based on the comparison result, to accept or reject to reflect the selected setting information to the actual setting to be used.

BRIEF DESCRIPTION OF THE DRAWINGS

FIG. 3 is an explanation diagram illustrating an example of option information illustrated in FIG. 2;

FIG. 4 is an explanation diagram illustrating an example of setting information illustrated in FIG. 2;

FIG. 5 is a flowchart illustrating an operation example of the image formation system illustrated in FIG. 1;

FIG. 7 is a flowchart illustrating an operation example of the image formation system illustrated in FIG. 1;

FIG. 8 is an explanation diagram illustrating an example of the display screen in the image formation system illustrated in FIG. 1;

FIG. 11 is an explanation diagram illustrating an example of the display screen in the image formation system illustrated in FIG. 1;

FIG. 13 is an explanation diagram illustrating an example of the display screen in the image formation system illustrated in FIG. 1;

FIG. 14 is an explanation diagram illustrating an example of the display screen in the image formation system illustrated in FIG. 1;

FIG. 20 is an explanation diagram illustrating an example of a display screen in the image formation system according to a modification example;

DETAILED DESCRIPTION

Figure 1:
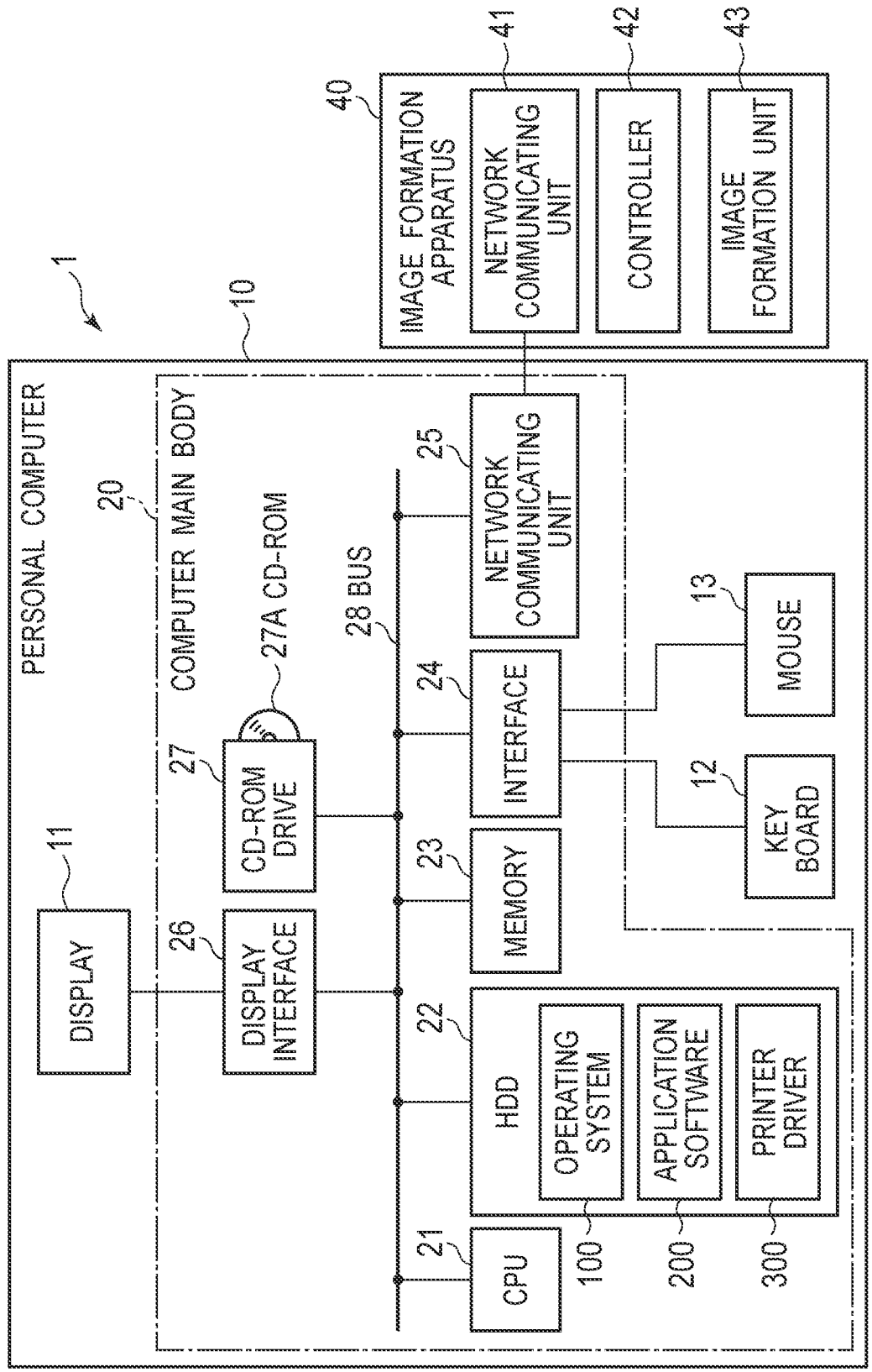
FIG. 1 is a block diagram illustrating a configuration example of an image formation system according to an embodiment.

Hereinafter, embodiments are described in detail with reference to the drawings.

In the respective drawings referenced herein, the same constitutions are designated by the same reference numerals and duplicate explanation concerning the same constitutions is basically omitted. All of the drawings are provided to illustrate the respective examples only. No dimensional proportions in the drawings shall impose a restriction on the embodiments. For this reason, specific dimensions and the like should be interpreted with the following descriptions taken into consideration. In addition, the drawings include parts whose dimensional relationship and ratio are different from one drawing to another.

Embodiment

Configuration Example

FIG. 1 illustrates one configuration example an image formation system 1 provided with an information processing apparatus (personal computer 10) according to one embodiment. The image formation system 1 is provided with the personal computer 10 and an image formation apparatus 40.

The personal computer 10 generates digital content data such as document data and image data using application software based on an operation by a user, and generates printing data DP based on the digital content data using a printer driver. The personal computer 10 is provided with a display 11, a keyboard 12, a mouse 13, and a computer main body 20.

The display 11 displays an image based on an instruction from the computer main body 20. The keyboard 12 and the mouse 13 are used for the user to input information.

The computer main body 20 includes a central processing unit (CPU) 21 or a processor, a hard disk drive (HDD) 22 or a hard drive, a memory 23, an interface 24, a network communicating unit 25 or a communication interface, a display interface 26, and a compact disc read only memory (CD-ROM) drive 27. The CPU 21, the HDD 22, the memory 23, the interface 24, the network communicating unit 25, the display interface 26, and the CD-ROM drive 27 are communicably connected to one another via a bus 28 in this example.

The CPU 21 executes various kinds of programs such as an operating system, application software, and a printer driver.

The HDD 22 stores various kinds of programs and data. An operating system 100, application software 200, and a printer driver 300, and the like are installed on the personal computer 10, and the software thereof are stored in the HDD 22 as programs.

The operating system 100 is what is called basic software that controls an operation of the personal computer 10. The application software 200 includes, for example, image editing software, desk top publishing (DTP) software, word processing software, and the like, and generates digital content data. The printer driver 300 is what is called device driver that controls an operation of the image formation apparatus 40. The printer driver 300 is recorded on a CD-ROM 27A, for example, and is installed on the personal computer 10 by a manual operation by the user. It should be noted that the printer driver 300 is not limited thereto, but may be downloaded from a server, which is not illustrated, via the Internet, and may be installed automatically on the personal computer 10, for example.

Moreover, the HDD 22 also stores digital content data that the personal computer 10 generates using the application software 200 based on the operation by the user.

The memory 23 temporarily stores information when the CPU 21 performs processing, and is configured by using a dynamic random-access memory (DRAM), for example.

The interface 24 is an interface for electrically connecting the computer main body 20 to an external apparatus. In this example, the computer main body 20 is coupled to the keyboard 12 and the mouse 13 via the interface 24.

The network communicating unit 25 performs communication with the image formation apparatus 40 using a wired local area network (LAN), in this example. It should be noted that the network communicating unit 25 is not limited thereto, but instead of this, may perform communication using a wireless LAN, or may perform communication using a universal serial bus (USB) and the like, for example.

The display interface 26 is an interface for connecting the display 11 to the computer main body 20.

The CD-ROM drive 27 reads data recorded on a CD-ROM 27A.

The image formation apparatus 40 forms an image on a printing medium or a recording medium such as paper based on the printing data DP supplied from the personal computer 10. The image formation apparatus 40 includes a network communicating unit 41, a controller 42, and an image formation unit 43.

The network communicating unit 41 performs communication with the personal computer 10 using the wired LAN. The controller 42 controls an operation of the image formation apparatus 40, and is equipped with a CPU, a DRAM, a nonvolatile memory, and the like, for example. The image formation unit 43 forms an image on a printing medium such as paper. In this example, the image formation unit 43 is configured to form an image indicated by the printing data DP on a printing medium such as paper, using developers colored in yellow, magenta, cyan, and black.

Moreover, the image formation apparatus 40 is capable of being equipped with various optional devices, or adding various optional functions. Specifically, in the image formation apparatus 40, for example, the number of paper supply trays that accommodate therein printing media can be changed. In the image formation apparatus 40, increasing the number of paper supply trays enables paper having various sizes to be set to the image formation apparatus 40, for example. Moreover, the image formation apparatus 40 can be equipped with a duplex printing unit for example. Moreover, the image formation apparatus 40 can be equipped with a hard disk drive. Moreover, the image formation apparatus 40 can be equipped with a finisher device. This finisher device is attached to enable the image formation apparatus 40 to perform what is called sorting processing when multiple copies of a document are printed, for example. Moreover, the image formation apparatus 40 can be equipped with a punch unit. This punch unit is attached to enable the image formation apparatus 40 to punch holes for filing in the paper on which the image is formed. Moreover, the image formation apparatus 40 can add a function to execute an encryption authentication printing job, for example. This function enables the image formation apparatus 40 to perform authentication processing based on, for example, a user name and a password that are included in the printing data DP supplied from the personal computer 10, and form an image on a printing medium based on the printing data DP only when the authentication is successful, for example.

It should be noted that the option devices and the option functions are not limited to these. For example, the image formation apparatus 40 may be equipped with a reader/writer for a secure digital memory (SD) card. Moreover, the image formation apparatus 40 may be equipped with a large capacity feeder (LCF). Moreover, the image formation apparatus 40 may use a developer of white color or a transparent developer, for example, in addition to the developers of yellow, magenta, cyan, and black colors. For example, even when an image is formed on colored paper, using the developer of white color can suppress an effect on the image caused by the color of colored paper. Moreover, for example, using the transparent developer enables a glossy image to be formed. Moreover, the image formation apparatus 40 may add a function to perform IC card authentication. This function enables the image formation apparatus 40 to perform authentication processing using an IC card of a user to allow a login only when the authentication is successful, and receive the operation by the user.

With this configuration, the personal computer 10 generates digital content data using the application software 200 based on the operation by the user, and generates the printing data DP using the printer driver 300 based on the digital content data. Further, the image formation apparatus 40 forms an image on a printing medium based on the printing data DP.

As described later, the printer driver 300 is configured to allow multiple driver settings (which is setting information ISET described later) to be registered thereto, and generates the printing data DP based on one of the driver settings that is selected by the user. Moreover, the image formation apparatus 40 stores option information IOPT indicating an option state, that is, states of the option devices and the optional functions of the image formation apparatus 40. The personal computer 10 can grasp the option state of the image formation apparatus 40 by acquiring the option information IOPT from the image formation apparatus 40. The user sometimes selects a driver setting prior to providing a printing instruction. When the user selects a driver setting, the printer driver 300 checks whether the option information IOPT indicating the option state when the driver setting selected by the user was registered and the latest option information IOPT acquired from the image formation apparatus 40 match each other. When these two sets of the option information IOPT match each other, the printer driver 300 reflects the selected driver setting which is selected by the user to an actual driver setting to be used to perform the image formation processing such as printing. In contrast, when these two sets of the option information IOPT are unmatched, the printer driver 300 declines to reflect the selected driver setting to the actual driver setting to be used to perform the image formation processing such as printing. In this manner, the printer driver 300 rejects, based on the comparison result of these two sets of the option information IOPT, processing of reflecting the selected driver setting to the actual setting to be used.

Figure 2:
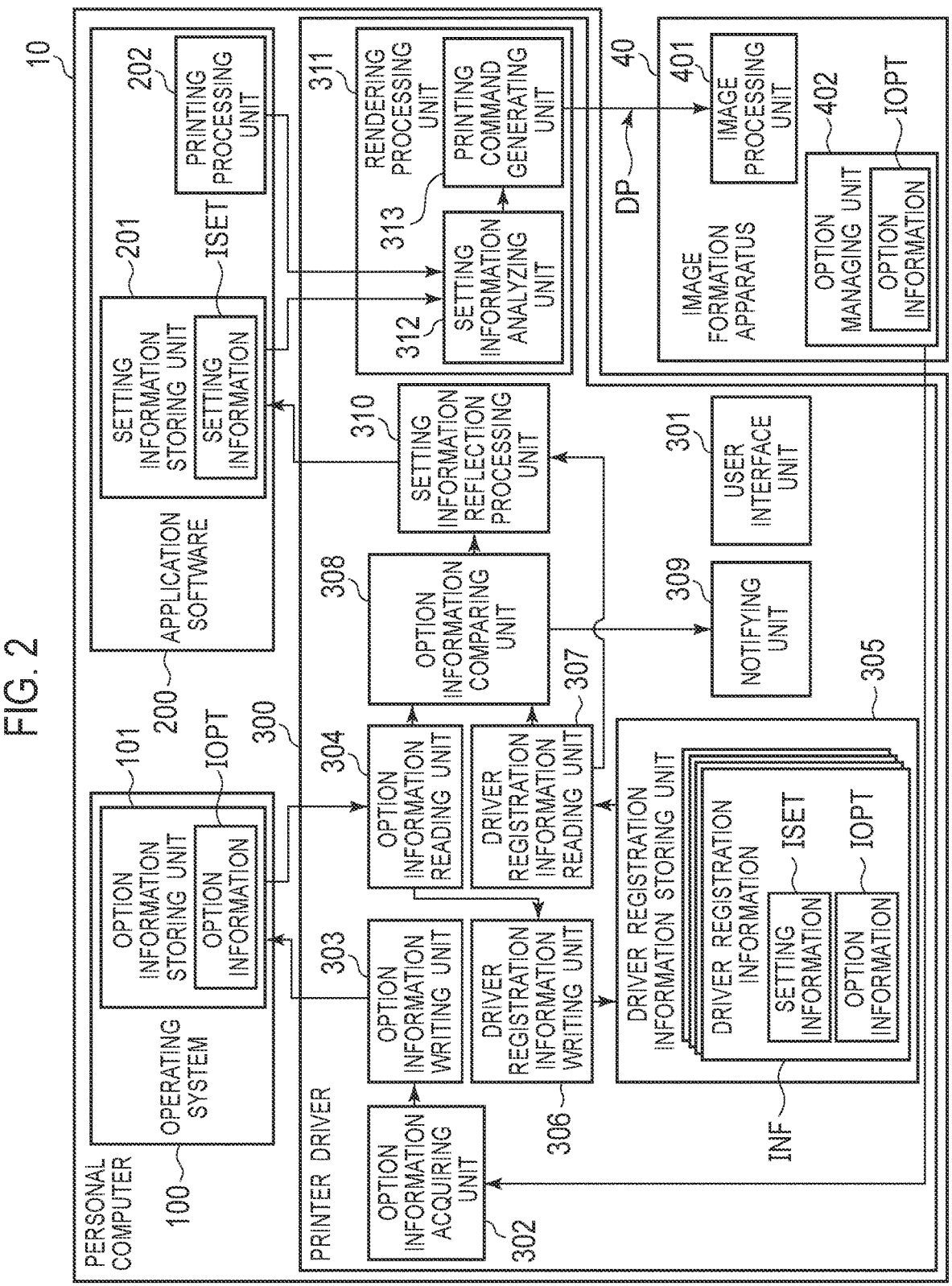
FIG. 2 is a block diagram illustrating a software configuration example of the image formation system illustrated in FIG. 1.

FIG. 2 illustrates one example of a software configuration in the personal computer 10 and the image formation apparatus 40.

The operating system 100 includes an option information storing unit 101. The option information storing unit 101 stores the option information IOPT. The option information storing unit 101 corresponds to what is called a registry in the operating system 100, and physically corresponds to the HDD 22 illustrated in FIG. 1. The option information IOPT indicates option states about the option devices and the option functions in the image formation apparatus 40, and is acquired from the image formation apparatus 40.

FIG. 3 illustrates one configuration example of the option information IOPT. The option information IOPT contains information about various states of optional functions such as the number of paper supply trays, the presence or absence of the duplex printing unit, the presence or absence of the hard disk drive, the presence or absence of the finisher device, the presence or absence of the punch unit, and the presence or absence of a function to print the encryption authentication printing job.

The personal computer 10 acquires such the option information IOPT from the image formation apparatus 40, and causes the option information storing unit 101 to store the acquired option information IOPT. In other words, the option information storing unit 101 stores the latest option information IOPT acquired from the image formation apparatus 40.

The printer driver 300 includes a user interface unit 301, an option information acquiring unit 302, an option information writing unit 303, an option information reading unit 304, a driver registration information storing unit 305, a driver registration information writing unit 306, a driver registration information reading unit 307, an option information comparing unit 308, a notifying unit 309, a setting information reflection processing unit 310, and a rendering processing unit 311.

The user interface unit 301 causes various interface screens to be displayed on the display 11 of the personal computer 10 with graphical user interfaces (GUI), and receives an instruction from the user via the keyboard 12 and the mouse 13.

The option information acquiring unit 302 acquires the option information IOPT from the image formation apparatus 40 via the network communicating unit 25 (FIG. 1).

The option information writing unit 303 writes the option information IOPT acquired by the option information acquiring unit 302 into the option information storing unit 101 of the operating system 100.

The option information reading unit 304 reads the option information IOPT from the option information storing unit 101 of the operating system 100.

The driver registration information storing unit 305 stores driver registration information INF. The driver registration information storing unit 305 physically corresponds to the HDD 22 illustrated in FIG. 1. In this example, the driver registration information storing unit 305 stores multiple sets of the driver registration information INF. Each driver registration information INF contains the setting information ISET and option information IOPT. The setting information ISET is setting information on the driver setting, and contains setting information on image formation processing in the image formation apparatus 40.

FIG. 4 illustrates one configuration example of the setting information ISET. The setting information ISET contains information about settings of various types of parameters such as a paper size, a paper supply method, a paper type, a paper thickness, a layout type, duplex printing, a direction of printing, color or monochrome, a toner saving, and the like.

In response to an instruction to register the driver setting from the user, the setting information ISET is stored in the driver registration information storing unit 305. In that case, the setting information ISET associated with the latest option information IOPT acquired from the image formation apparatus 40 at the registration of the driver setting is stored as the driver registration information INF in the driver registration information storing unit 305.

When the user provides an instruction to register a new driver setting, the driver registration information writing unit 306 associates the setting information ISET regarding to the new driver setting and the option information IOPT with each other, and writes the driver registration information INF including the setting information ISET regarding to the new driver setting and the option information IOPT, into the driver registration information storing unit 305. Specifically, the driver registration information writing unit 306 associates the latest option information IOPT acquired from the image formation apparatus 40 at the registration of the driver setting with the setting information ISET regarding to the driver setting, and writes the setting information ISET and the option information IOPT, as the driver registration information INF, into the driver registration information storing unit 305.

When the user selects the registered driver setting, for example, prior to providing the printing instruction, the driver registration information reading unit 307 reads the setting information ISET regarding the selected driver setting and the option information IOPT associated with the setting information ISET from the driver registration information storing unit 305.

When the user selects the registered driver setting, the option information comparing unit 308 compares the option information IOPT supplied from the option information reading unit 304 with the option information IOPT supplied from the driver registration information reading unit 307.

The notifying unit 309 provides a notification of caution such as warning to the user based on a comparison result in the option information comparing unit 308, by using the user interface unit 301. Specifically, the notifying unit 309 provides a notification of caution such as warning to the user when the option information IOPT supplied from the option information reading unit 304 and the option information IOPT supplied from the driver registration information reading unit 307 are unmatched.

When the user selects one of the registered driver settings, the setting information reflection processing unit 310 determines to accept or reject, based on the comparison result in the option information comparing unit 308, reflecting the setting information ISET in the selected driver setting to an actual setting to be used. Moreover, the setting information reflection processing unit 310 also has a function to reflect the editing content to the actual setting to be used when the user edits the driver setting. When the user provides an instruction to determine a driver setting to be used, the setting information reflection processing unit 310 then supplies the determined setting information ISET to the application software 200.

The rendering processing unit 311 generates the printing data DP based on an instruction from the application software 200. The rendering processing unit 311 includes a setting information analyzing unit 312 and a printing command generating unit 313. The setting information analyzing unit 312 analyzes the setting information ISET supplied from the application software 200, and reflects information on each parameter included in the setting information ISET to a printing command supplied from the application software 200. The printing command generating unit 313 generates a printing command based on the printing command that is supplied from the setting information analyzing unit 312 and in which the setting information ISET is reflected. The printing command generating unit 313 then supplies the generated printing command as the printing data DP via the network communicating unit 25 illustrated in FIG. 1 to the image formation apparatus 40.

The application software 200 includes a setting information storing unit 201 and a printing processing unit 202. The setting information storing unit 201 temporarily stores the setting information ISET supplied from the printer driver 300. The setting information storing unit 201 physically corresponds to the memory 23 illustrated in FIG. 1. Further, when the user provides a printing instruction, the setting information storing unit 201 supplies the setting information ISET to the printer driver 300. The printing processing unit 202 issues a printing job based on digital content data, when the user provides a printing instruction.

The image formation apparatus 40 includes an image processing unit 401 and an option managing unit 402. The image processing unit 401 performs prescribed image processing based on the printing data DP to generate image data, and supplies the image data to the image formation unit 43 illustrated in FIG. 1. The option managing unit 402 manages states of options in the image formation apparatus 40. The option managing unit 402 detects the option states about the option devices and the option functions of the image formation apparatus 40, for example, in a case where an administrator of the image formation apparatus 40 installs the option device to the image formation apparatus 40, removes the option device from the image formation apparatus 40, adds the option function to the image formation apparatus 40, or deletes the option function from the image formation apparatus 40. Further, the option managing unit 402 updates the option information IOPT stored in a non-volatile memory in the controller 42 illustrated in FIG. 1 based on the detection result. In this way, the option states about the option devices and the option functions in the image formation apparatus 40 are reflected to the option information IOPT stored in the option managing unit 402.

Here, the option information storing unit 101, the driver registration information storing unit 305, and the HDD 22 correspond to one specific example of the "storing unit" in the disclosure. The network communicating unit 25 corresponds to one specific example of the "communicating unit" in the disclosure. The option information comparing unit 308, the setting information reflection processing unit 310, and the CPU 21 correspond to one specific example of the "processing unit" in the disclosure. The user interface unit 301, the keyboard 12, and the mouse 13 correspond to one specific example of the "operating unit" in the disclosure. The option information IOPT stored in the driver registration information storing unit 305 corresponds to one specific example of the "first apparatus information" in the disclosure. The setting information ISET stored in the driver registration information storing unit 305 corresponds to one specific example of the "setting information" in the disclosure. The option information IOPT stored in the option information storing unit 101 corresponds to one specific example of the "second apparatus information" in the disclosure.

Operation and Effect

Subsequently, an operation and an effect of the image formation system 1 in the embodiment are described.
(Overall Operation Overview)

Firstly, with reference to FIGS. 1 and 2, an overall operation overview of the image formation system 1 is described. The personal computer 10 generates digital content data using the application software 200 based on the operation by the user, and generates the printing data DP using the printer driver 300 based on the digital content data.

Specifically, in the printer driver 300 illustrated in FIG. 2, when the user provides a printing instruction based on the digital content data, the user often selects one of the registered driver settings prior to providing the printing instruction. When the user selects one of the registered driver settings, for example, the driver registration information reading unit 307 reads the option information IOPT associated with the setting information ISET regarding the selected driver setting, from the driver registration information storing unit 305. The option information comparing unit 308 compares the option information IOPT supplied from the option information reading unit 304 with the option information IOPT supplied from the driver registration information reading unit 307. The notifying unit 309 provides a notification of caution such as warning to the user when the option information IOPT supplied from the option information reading unit 304 and the option information IOPT supplied from the driver registration information reading unit 307 are unmatched. The setting information reflection processing unit 310 restricts processing of reflecting the setting information ISET regarding the selected driver setting to the actual setting information ISET to be used based on the comparison result in the option information comparing unit 308. Further, when the user provides an instruction to decide a driver setting to be used, the setting information reflection processing unit 310 supplies the decided setting information ISET to the application software 200.

The setting information storing unit 201 of the application software 200 temporarily stores the setting information ISET supplied from the printer driver 300. The printing processing unit 202 issues a printing command based on the digital content data. The setting information analyzing unit 312 of the printer driver 300 analyzes the setting information ISET supplied from the application software 200, and reflects information about each parameter included in the setting information ISET to the printing command supplied from the application software 200. The printing command generating unit 313 generates a printing command based on the printing command that is supplied from the setting information analyzing unit 312 and in which the setting information ISET is reflected. Further, the printing command generating unit 313 supplies the generated printing command as the printing data DP to the image formation apparatus 40.

The image formation apparatus 40 then forms an image on a printing medium based on the printing data DP.
(Detailed Operation)

The following describes an operation of the image formation system 1 in details.
(Acquisition of Option Information IOPT)

The personal computer 10 acquires the option information IOPT from the image formation apparatus 40, and stores the acquired option information IOPT in the option information storing unit 101. The following describes in details a case where the personal computer 10 acquires the option information IOPT based on an operation by the user as an example.

FIG. 5 illustrates one example of acquisition processing of the option information IOPT.

When the user provides a display instruction of a screen (an option information acquisition screen 500) on which acquisition of the option information IOPT is instructed, the user interface unit 301 receives the display instruction of the option information acquisition screen 500 (Step S101). The option information reading unit 304 then reads the option information IOPT from the option information storing unit 101 of the operating system 100 (Step S102). The user interface unit 301 then displays the option information acquisition screen 500 based on the read option information IOPT (Step S103).

Figure 6:
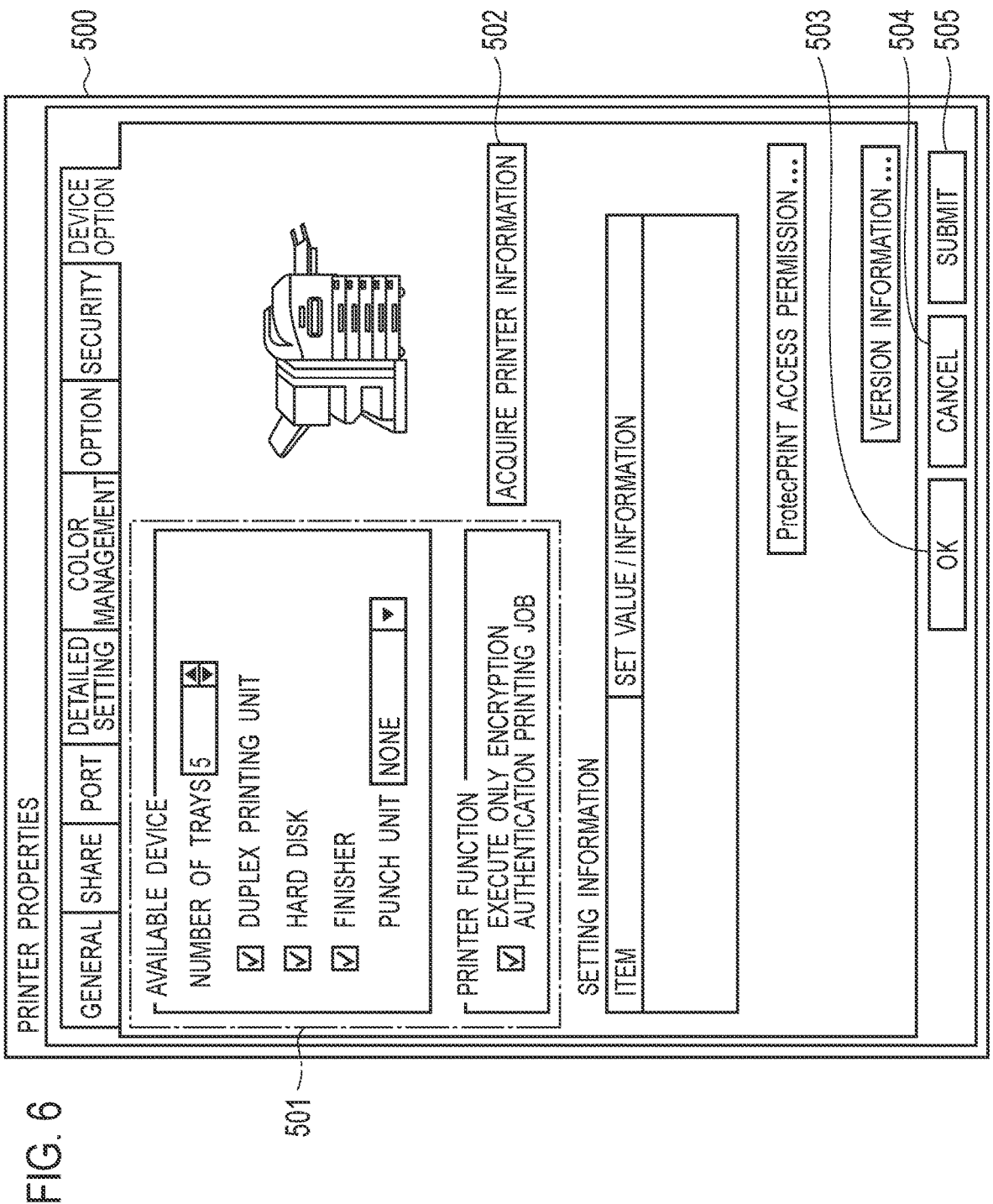
FIG. 6 is an explanation diagram illustrating an example of a display screen in the image formation system illustrated in FIG. 1.

FIG. 6 illustrates one example of the option information acquisition screen 500. The option information acquisition screen 500 in this example is a screen that is displayed when the user causes a printer property screen to be displayed, and selects (for example, by touching or clicking) a "DEVICE OPTION" tab. The option information acquisition screen 500 contains an option information display field 501, an "ACQUIRE PRINTER INFORMATION" button 502, an "OK" button 503, a "CANCEL" button 504, and a "SUBMIT" button 505.

The option information display field 501 is a field on which information included in the option information IOPT read at Step S102 is displayed. Specifically, in this example, based on information about the number of paper supply trays included in the option information IOPT, "5" is set in a pull-down menu regarding the number of trays. Similarly, based on information included in the option information IOPT and indicating that a duplex printing unit, a hard disk drive, and a finisher device are installed, checkmarks are respectively placed in a check box regarding the duplex printing unit, a check box regarding the hard disk drive, and a check box regarding the finisher device. Moreover, based on information included in the option information IOPT and indicating that no punch unit is installed, "NONE" is set in a pull-down menu regarding the punch unit. Moreover, based on information included in the option information IOPT and indicating that a function to execute an encryption authentication printing job is added, a checkmark is placed in a check box regarding "EXECUTE ONLY ENCRYPTION AUTHENTICATION PRINTING JOB". Moreover, in this example, the user can edit the option information IOPT by operating these pull-down menus and check boxes, in the option information display field 501.

The "ACQUIRE PRINTER INFORMATION" button 502 is a button with which the user instructs the acquisition of the option information IOPT.

The "OK" button 503 is a button for storing the information in the option information acquisition screen 500, and ending the display of the option information acquisition screen 500. The "CANCEL" button 504 is a button for discarding the information in the option information acquisition screen 500, and ending the display of the option information acquisition screen 500. The "SUBMIT" button 505 is a button for storing information in the option information acquisition screen 500. For example, when the user operates the "OK" button 503 or the "SUBMIT" button 505, the option information writing unit 303 writes the information (the option information IOPT) displayed on the option information display field 501 into the option information storing unit 101 of the operating system 100.

In the option information acquisition screen 500, when the user operates (for example, by touching or clicking) the "ACQUIRE PRINTER INFORMATION" button 502, the option information acquiring unit 302 requests the option information IOPT of the image formation apparatus 40 based on the operation by the user (Step S104).

Next, the printer driver 300 checks whether the option information acquiring unit 302 has been able to acquire the option information IOPT (Step S105). If the option information acquiring unit 302 has been unable to acquire the option information IOPT ("N" at Step S105), the processing is proceeded to Step S108. For example, when the power supply of the image formation apparatus 40 is in an off-state, the option information acquiring unit 302 is unable to acquire the option information IOPT, and thus the processing is proceeded to Step S108.

If the option information acquiring unit 302 has been able to acquire the option information IOPT at Step S105 ("Y" at Step S105), the user interface unit 301 updates the information in the option information display field 501 based on the acquired option information IOPT (Step S106).

Next, the option information writing unit 303 writes the acquired option information IOPT into the option information storing unit 101 of the operating system 100 based on the operation by the user (Step S107).

When the user operates the "OK" button 503, for example, in the option information acquisition screen 500, the user interface unit 301 ends the display of the option information acquisition screen 500 (Step S108).

This is the end of the flow.

It should be noted that although the personal computer 10 acquires the option information IOPT from the image formation apparatus 40 based on the operation of the "ACQUIRE PRINTER INFORMATION" button 502 by the user in this example, the embodiment is not limited to this. For example, the personal computer 10 may acquire the option information IOPT from the image formation apparatus 40, every time when a printing setting screen for performing printing setting is displayed.

In this manner, the personal computer 10 acquires the option information IOPT from the image formation apparatus 40, and stores the option information IOPT in the option information storing unit 101. Thus, the option information storing unit 101 stores the option information IOPT in which the option states about the option devices and the option functions in the image formation apparatus 40 are reflected.

(Registration of Driver Setting)

The printer driver 300 can accept registration of multiple driver settings. The following describes the registration processing of a driver setting in details.

FIG. 7 illustrates one example of the registration processing of a driver setting.

Firstly, the personal computer 10 launches the application software 200 based on the user operation (Step S121). Next, when the user provides an instruction to display a screen (printing setting screen 510) for performing printing setting, the user interface unit 301 of the printer driver 300 displays the printing setting screen 510 based on the user operation (Step S122).

FIG. 8 illustrates one example of the printing setting screen 510. The printing setting screen 510 contains a "setting name" pull-down menu 511, a "SETTING REGISTRATION" button 512, a "SETTING MANAGEMENT" button 513, a driver setting editing field 514, an "OK" button 515, a "CANCEL" button 516, and a "SUBMIT" button 517.

The "setting name" pull-down menu 511 is used for selecting one driver setting among the registered driver settings. The user operates the "setting name" pull-down menu 511 to pull-down display a list of setting names. The "SETTING REGISTRATION" button 512 is used for registering a driver setting. The "SETTING MANAGEMENT" button 513 is used for managing the registered driver setting.

The driver setting editing field 514 is used for editing the driver setting. Specifically, in the driver setting editing field 514, the user can edit settings of various parameters such as a paper size, a paper supply method, a paper type, a paper thickness, a layout type, duplex printing, a direction of printing, color or monochrome, a toner saving, and the like.

The "OK" button 515 is a button for storing the information in the printing setting screen 510 to be stored, and ending the display of the printing setting screen 510. The "CANCEL" button 516 is a button for discarding the information in the printing setting screen 510, and ending the display of the printing setting screen 510. The "SUBMIT" button 517 is a button for storing information in the printing setting screen 510.

When the user performs a setting editing operation of the driver setting in the driver setting editing field 514, the user interface unit 301 receives the setting editing operation by the user (Step S123).

Next, when the user operates the "SETTING REGISTRATION" button 512, the user interface unit 301 receives a registration instruction of the driver setting by the user (Step S124). The user interface unit 301 then displays a registration screen 520 for the driver setting.

Figure 9:
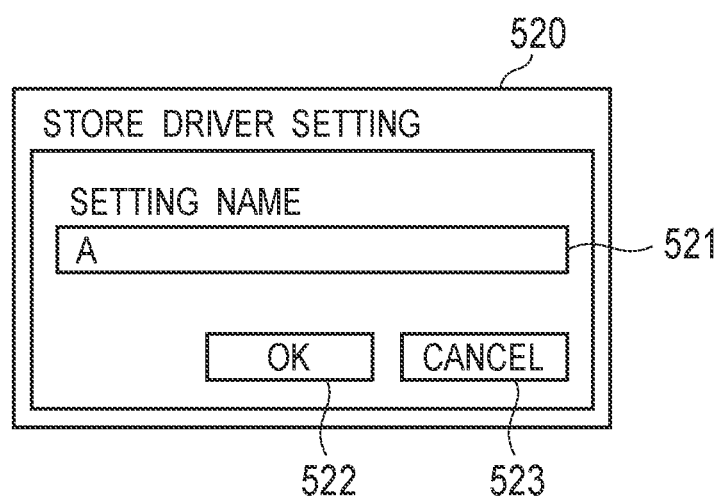
FIG. 9 is an explanation diagram illustrating an example of the display screen in the image formation system illustrated in FIG. 1.

FIG. 9 illustrates one example of the registration screen 520 for the driver setting. The registration screen 520 contains a "SETTING NAME" text box 521, an "OK" button 522, and a "CANCEL" button 523. The "SETTING NAME" text box 521 is used for inputting a setting name for identifying a driver setting. The "OK" button 522 is used for accepting the setting name inputted into the "SETTING NAME" text box 521 as a setting name of a driver setting to be registered. The "CANCEL" button 523 is used for discarding the setting name inputted into the "SETTING NAME" text box 521.

When the user inputs a setting name (name "A" in this example) into the "SETTING NAME" text box 521 and operates the "OK" button 522, the option information reading unit 304 reads the option information IOPT from the option information storing unit 101 of the operating system 100 (Step S125).

Next, the driver registration information writing unit 306 writes the information (the setting information ISET) in which the user edits in the driver setting editing field 514 and the option information IOPT read at Step S125 in association with each other, as the driver registration information INF, into the driver registration information storing unit 305 (Step S126).

For example, when the user operates the "OK" button 515 in the printing setting screen 510, the user interface unit 301 ends the display of the printing setting screen 510 (Step S127). When the user performs an operation of ending the application software 200, the personal computer 10 ends the application software 200 based on the operation (Step S128).

This is the end of the flow.

In this manner, the setting information ISET associated with the latest option information IOPT acquired from the image formation apparatus 40 at the registration of the driver setting, as the driver registration information INF, is stored in the driver registration information storing unit 305.

(Printing Processing)

The personal computer 10 receives, for example, an operation of selecting the registered driver setting by the user, and generates the printing data DP using the selected driver setting based on the digital content data. The following describes the printing processing in detail.

Figure 10:
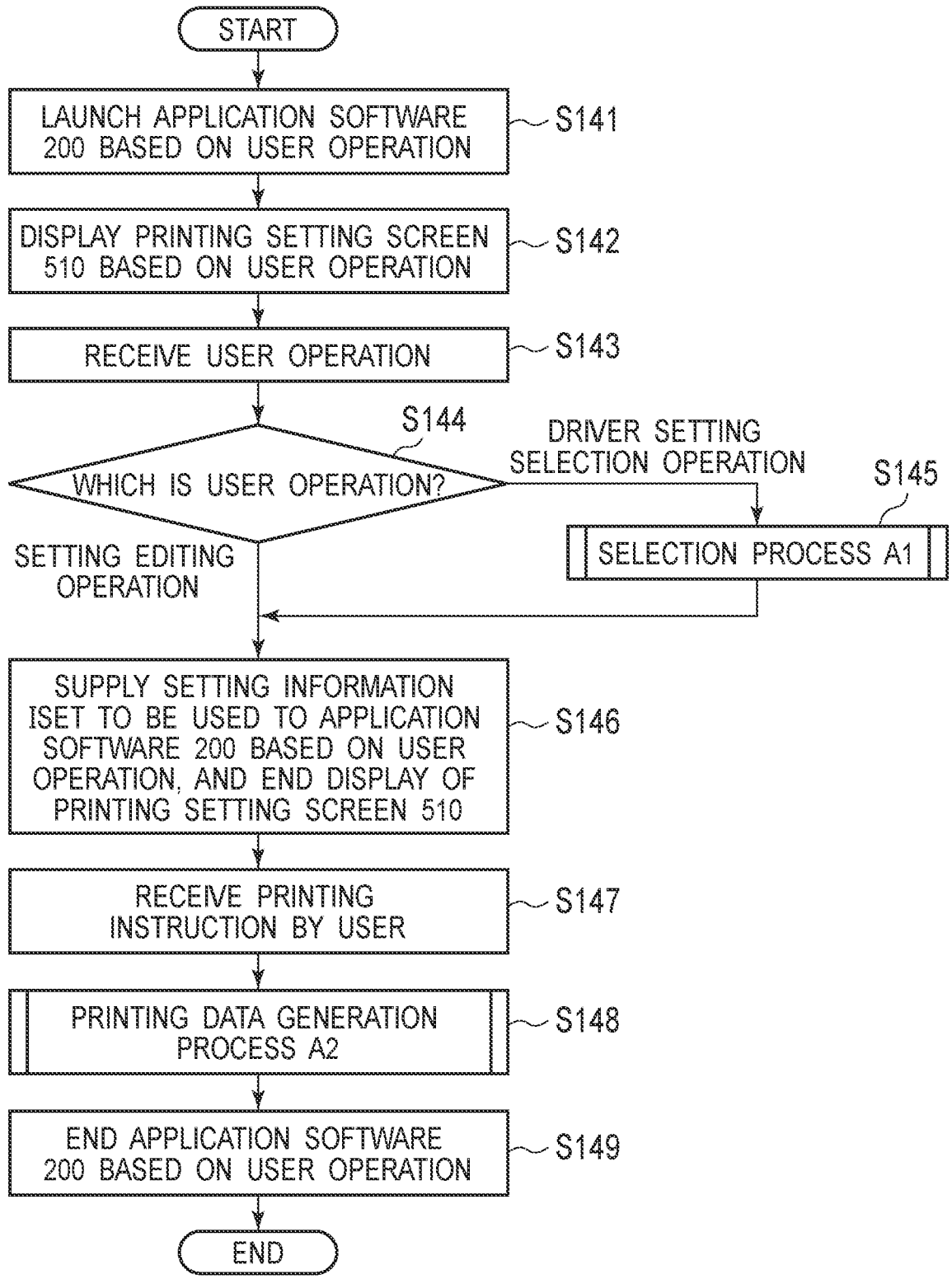
FIG. 10 is a flowchart illustrating an operation example of the image formation system illustrated in FIG. 1.

FIG. 10 illustrates one example of the printing processing.

Firstly, the personal computer 10 launches the application software 200 based on the user operation (Step S141). The personal computer 10 then opens a file of digital content data to be printed based on the user operation.

Next, when the user provides a display instruction of the printing setting screen 510 illustrated in FIG. 8, the user interface unit 301 of the printer driver 300 displays the printing setting screen 510 based on the user operation (Step S142).

The user interface unit 301 then receives the operation by the user (Step S143).

Next, the user interface unit 301 checks an operation content by the user (Step S144). If the operation content by the user is a setting editing operation in the driver setting editing field 514 ("setting editing operation" at Step S143), the processing is proceeded to Step S146. In other words, in this case, the setting information reflection processing unit 310 reflects the editing content to the setting information ISET as the actual setting to be used to print, the user interface unit 301 updates the information in the driver setting editing field 514 based on the setting information ISET to be used, and the processing is proceeded to Step S146.

If the operation content by the user is a driver setting selection operation in the "setting name" pull-down menu 511 at Step S144 ("driver setting selection operation" at Step S144), the printer driver 300 performs a selection process A1 (Step S145). Specifically, as illustrated in FIG. 11, when the user interface unit 301 pull-down displays a driver setting list 511A in the pull-down menu 511 and the user selects one of the driver settings (for example, driver setting assigned with the setting name "A") in the pull-down menu 511, the printer driver 300 performs the selection process A1.

Figure 12:
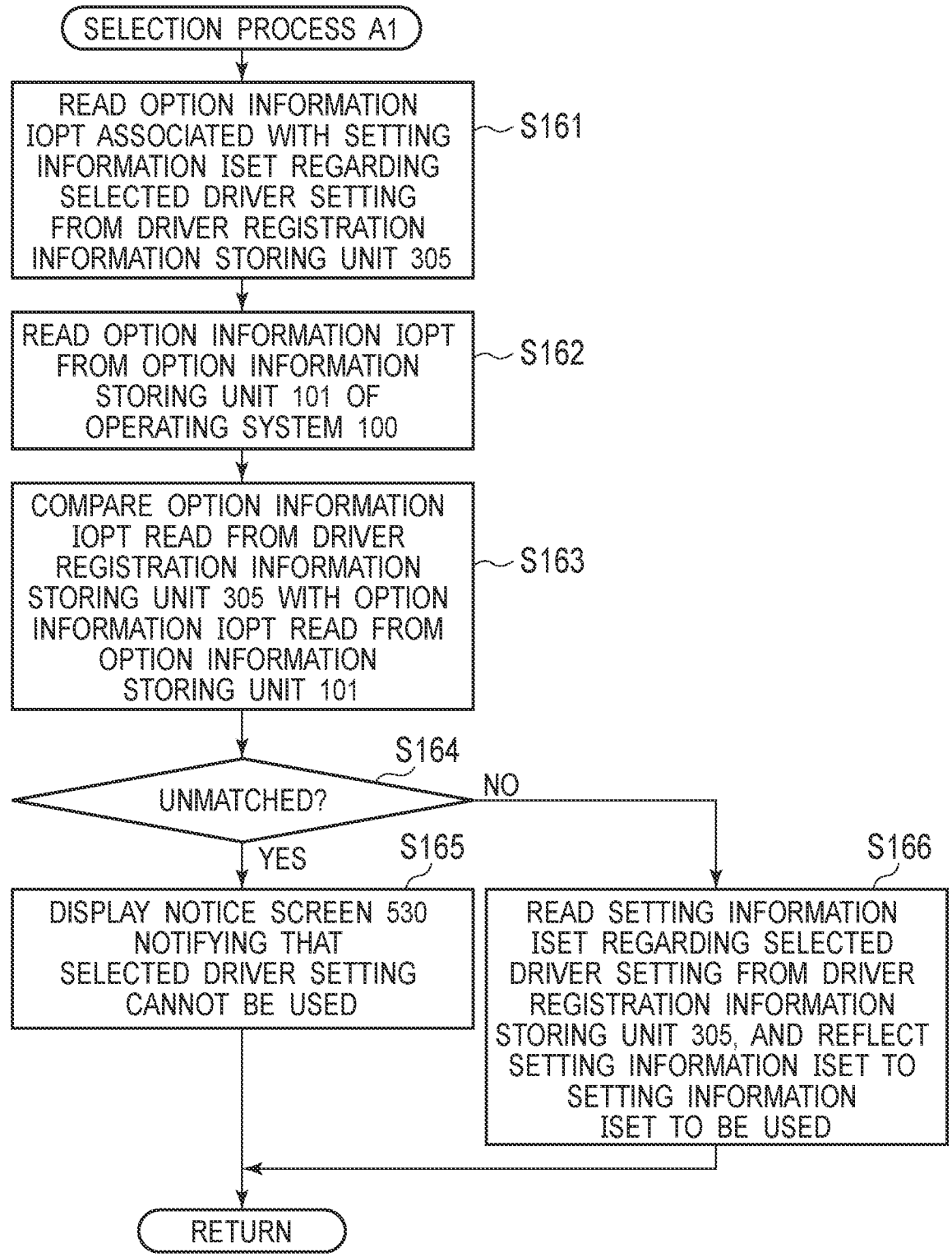
FIG. 12 is a flowchart illustrating an operation example of the image formation system illustrated in FIG. 1.

FIG. 12 illustrates one example of a subroutine of the selection process A1.

Firstly, the driver registration information reading unit 307 reads the option information IOPT (in this example, option information IOPTA) associated with the setting information ISET (in this example, setting information ISETA) regarding the selected driver setting, from the driver registration information storing unit 305 (Step S161). The option information IOPT indicates the option state in the image formation apparatus 40 when the selected driver setting is registered.

Next, the option information reading unit 304 reads the option information IOPT, from the option information storing unit 101 of the operating system 100 (Step S162). The option information IOPT is the latest option information IOPT acquired from the image formation apparatus 40.

Next, the option information comparing unit 308 compares the option information IOPT (in this example, the option information IOPTA) read from the driver registration information storing unit 305 at Step S161 with the option information IOPT read from the option information storing unit 101 at Step S162 (Step S163).

If the option information IOPT (in this example, the option information IOPTA) read from the driver registration information storing unit 305 at Step S161 and the option information IOPT read from the option information storing unit 101 at Step S162 are unmatched ("Y" at Step S164), the user interface unit 301 displays a warning screen 530 notifying the caution that the selected driver setting cannot be used as the actual setting, as illustrated in FIG. 13 (Step S165). In other words, in this case, the setting information reflection processing unit 310 rejects to reflect the setting information ISET regarding the selected driver setting to the setting information ISET to be used.

Figure 14:
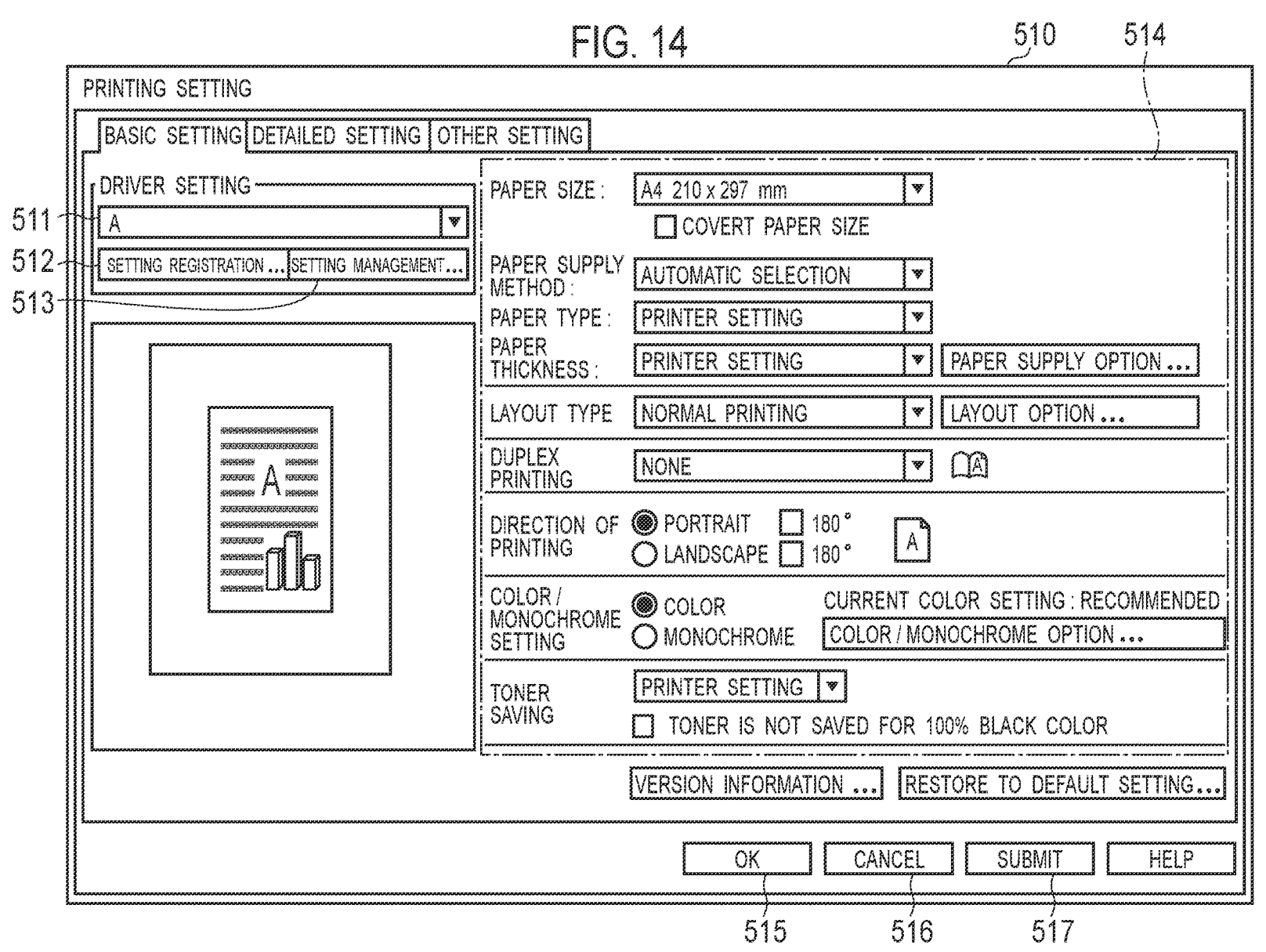

In contrast, if the option information IOPT (in this example, the option information IOPTA) read from the driver registration information storing unit 305 at Step S161 and the option information IOPT read from the option information storing unit 101 at Step S162 match each other ("N" at Step S164), the driver registration information reading unit 307 reads the setting information ISET (in this example, the setting information ISETA) regarding the selected driver setting from the driver registration information storing unit 305, and the setting information reflection processing unit 310 reflects the setting information ISET to the setting information ISET to be used for actual print processing (Step S166). The user interface unit 301 then updates the information in the driver setting editing field 514 based on the setting information ISET to be used for actual print processing, as illustrated in FIG. 14.

This is the end of the subroutine of the selection process A1.

Next, as illustrated in FIG. 10, when the user operates, for example, the "OK" button 515 to provide an instruction to decide the setting information ISET to be used for actual print processing, the setting information reflection processing unit 310 determines the setting information ISET to be used for actual print processing based on the information in the driver setting editing field 514, and supplies the determined setting information ISET to the application software 200, and the user interface unit 301 ends the display of the printing setting screen 510 (Step S146).

Next, when the user operates the application software 200 to provide a printing instruction, the application software 200 receives the printing instruction by the user (Step S147).

Next, the personal computer 10 performs a printing data generation process A2 (Step S148).

Figure 15:
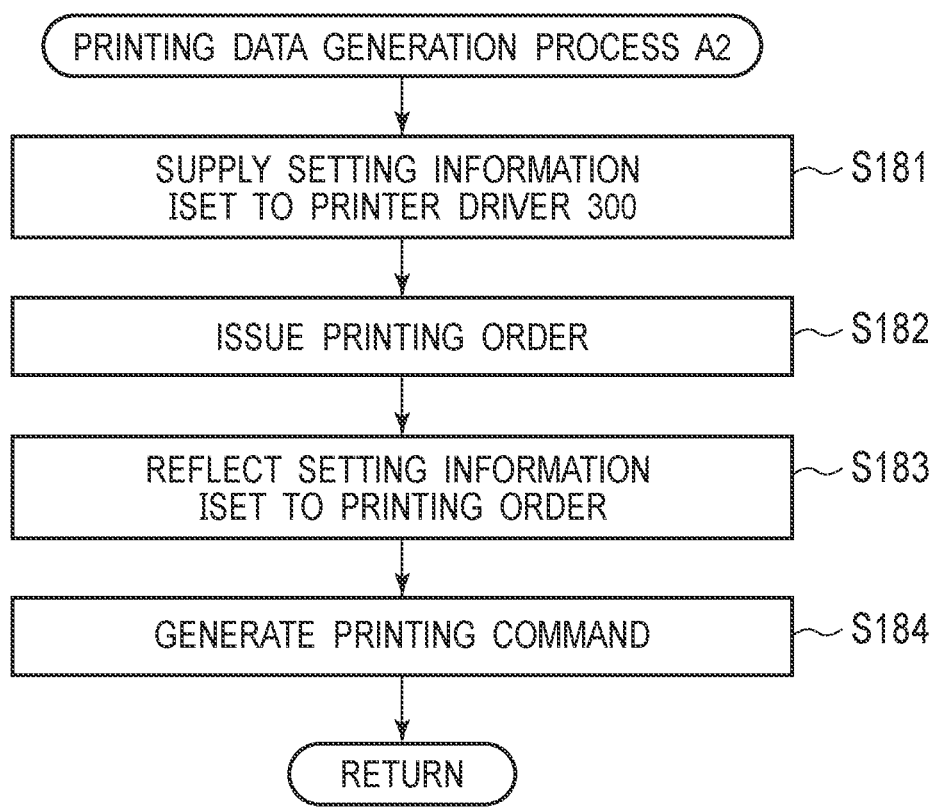
FIG. 15 is a flowchart illustrating an operation example of the image formation system illustrated in FIG. 1.

FIG. 15 illustrates one example of a subroutine of the printing data generation process A2.

Firstly, the setting information storing unit 201 of the application software 200 supplies the stored setting information ISET to the printer driver 300 (Step S181).

Next, the printing processing unit 202 of the application software 200 issues a printing command based on digital content data, and supplies the printing command to the printer driver 300 (Step S182).

Next, the setting information analyzing unit 312 of the printer driver 300 analyzes the setting information ISET supplied from the application software 200, and reflects information about each parameter included in the setting information ISET to the printing command supplied from the application software 200 (Step S183).

The printing command generating unit 313 of the printer driver 300 then generates a printing command based on the printing command that is supplied from the setting information analyzing unit 312 and in which the setting information ISET is reflected (Step S184). The printing command generating unit 313 then supplies the generated printing command as the printing data DP to the image formation apparatus 40.

This is the end of the subroutine of the printing data generation process A2.

As illustrated in FIG. 10, when the image formation processing is completed in the image formation apparatus 40 and the user performs an operation of ending the application software 200, the personal computer 10 ends the application software 200 based on the operation (Step S149).

This is the end of the flow.

In this manner, in the image formation system 1, when a driver setting is registered, the driver registration information storing unit 305 stores the setting information ISET associated with the option information IOPT. When the user selects the registered driver setting, the option information comparing unit 308 then compares the option information IOPT supplied from the option information reading unit 304 with the option information IOPT supplied from the driver registration information reading unit 307. Specifically, the option information comparing unit 308 compares the option information IOPT (in this example, the option information IOPTA) associated with the setting information ISET regarding the selected driver setting with the latest option information IOPT acquired from the image formation apparatus 40. The setting information reflection processing unit 310 then restricts processing of reflecting the setting information ISET regarding the selected driver setting to the actual setting to be used based on the comparison result. Specifically, the setting information reflection processing unit 310 accepts to reflect the selected driver setting to the actual driver setting to be used when these two sets of the option information IOPT match each other, whereas rejects to reflect the selected driver setting to the actual driver setting to be used when these two sets of the option information IOPT are unmatched. This enables the user to recognize whether the states of options of the image formation apparatus 40 is changed after the selected driver setting has been registered. Moreover, when the option device is removed from the image formation apparatus 40 or the option function is deleted, for example, the selected driver setting is not reflected. Accordingly, it is possible to reduce a concern that normal printing processing is not performed. As a result, it is possible to enhance the convenience for the user in the image formation system 1.

In the embodiment(s) as in the foregoing, setting information and option information are stored in association with each other when a driver setting is registered, and when the user selects the registered driver setting, option information supplied from the option information reading unit with option information supplied from the driver registration information reading unit, and processing of reflecting the selected driver setting to the actual setting to be used is limited based on the comparison result. Therefore, it is possible to enhance the convenience for the user.

First Modification Example

In the abovementioned embodiment, as illustrated in Steps S164 and S165 of FIG. 12, when two sets of the option information IOPT are unmatched, a notification that the selected driver setting cannot be used is made, however, an embodiment is not limited to this. For example, it may be possible to provide and notify the specific item which is unmatched among items included in the two sets of the option information IOPT. The following describes an image formation system 1A according to the modification example in details.

The image formation system 1A is provided with a personal computer 10A. A printer driver 300A is installed on the personal computer 10A. The printer driver 300A includes an option information comparing unit 308A. The option information comparing unit 308A compares the option information IOPT supplied from the option information reading unit 304 with the option information IOPT supplied from the driver registration information reading unit 307. Moreover, the option information comparing unit 308A also has a function to specify at least one unmatched item among multiple items included in these two sets of the option information IOPT.

Figure 16:
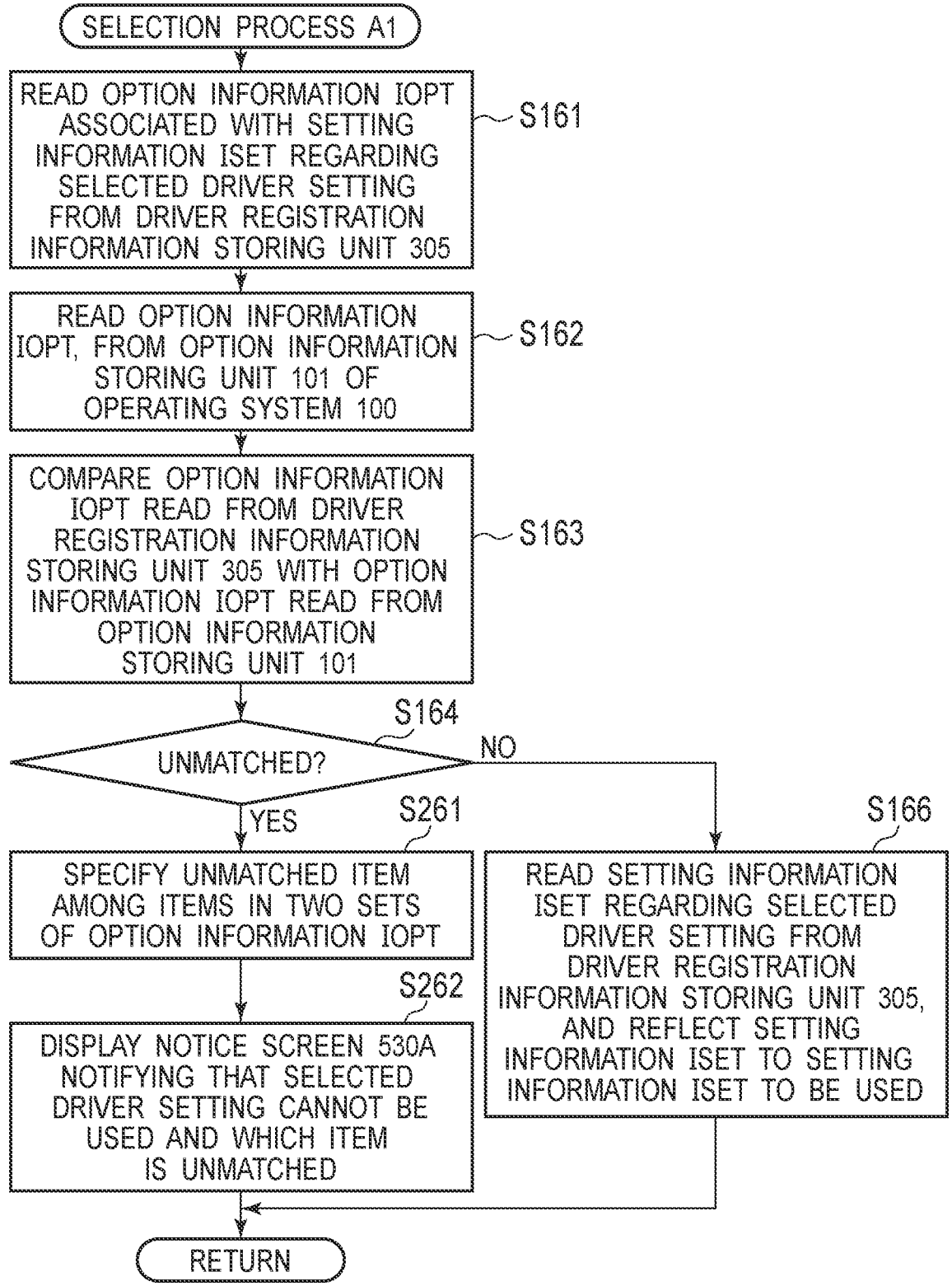
FIG. 16 is a flowchart illustrating an operation example of an image formation system according to a modification example.

FIG. 16 illustrates one example of the selection process A1 in the personal computer 10A. Steps S161 to S164 are similar to those in the case illustrated in FIG. 12 of the abovementioned embodiment.

If the option information IOPT (in this example, the option information IOPTA) read from the driver registration information storing unit 305 at Step S161 and the option information IOPT read from the option information storing unit 101 at Step S162 are unmatched ("Y" at Step S164), the option information comparing unit 308A specifies at least one unmatched item among multiple items included in these two sets of the option information IOPT (Step S261).

Figure 17:
FIG. 17 is an explanation diagram illustrating an example of a display screen in the image formation system according to a modification example.

The user interface unit 301 then displays a warning screen 530A notifying the caution that the selected driver setting cannot be used and specifying unmatched item in the option information IOPT, as illustrated in FIG. 17 (Step S262). In the example of FIG. 17, the warning screen 530A contains information indicating that a paper supply tray is added.

This enables the user to more specifically recognize a change in the option state in the image formation apparatus 40. Further, for example, the user can create and register a new driver setting in accordance with the change in the option state. For example, as illustrated in FIG. 17, when the user recognizes that a paper supply tray is added, the user can register a new driver setting in which the newly added paper supply tray is set as one of the paper supply method.

Second Modification Example

In the above-mentioned embodiment, as illustrated in Steps S144 and S145 of FIG. 14, when the user selects a driver setting, two sets of the option information IOPT are compared with each other, however, an embodiment is not limited to this. The following describes an image formation system 1B according to the modification example in details.

The image formation system 1B is provided with a personal computer 10B. A printer driver 300B is installed on the personal computer 10B. The printer driver 300B includes an option information comparing unit 308B. When the user interface unit 301 displays the printing setting screen 510, the option information comparing unit 308B compares the option information IOPT stored in the option information storing unit 101 with all the option information IOPT stored in the driver registration information storing unit 305.

Figure 18:
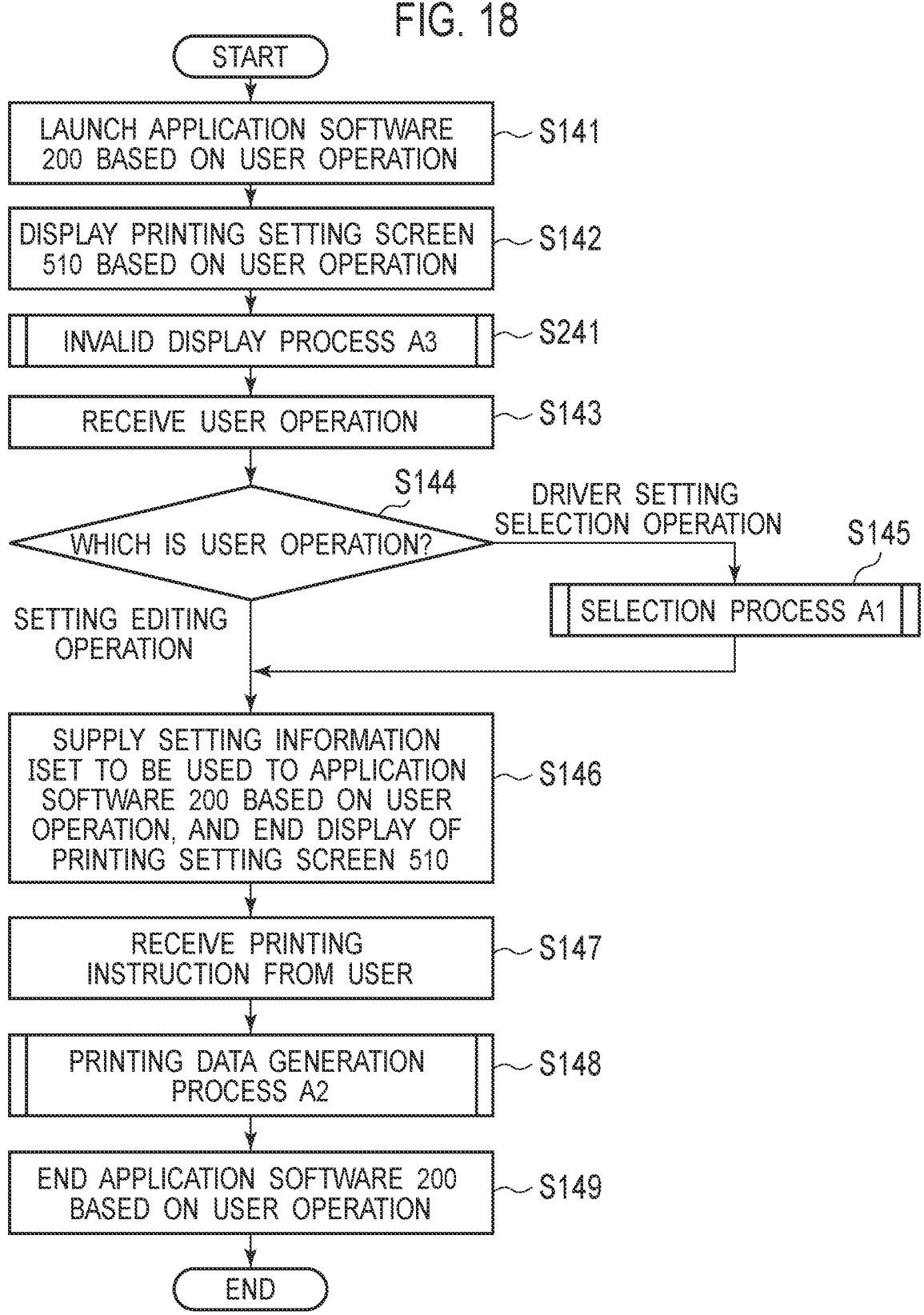
FIG. 18 is a flowchart illustrating an operation example of an image formation system according to a modification example.

FIG. 18 illustrates one example of printing processing in the personal computer 10B.

Firstly, the personal computer 10 launches the application software 200 based on the user operation (Step S141). The personal computer 10 then opens a file of digital content data to be printed based on the user operation. Next, when the user provides a display instruction of the printing setting screen 510 (FIG. 8), the user interface unit 301 of the printer driver 300B displays the printing setting screen 510 based on the user operation (Step S142).

Next, the printer driver 300B performs a disabling display process A3 (Step S241).

Figure 19:
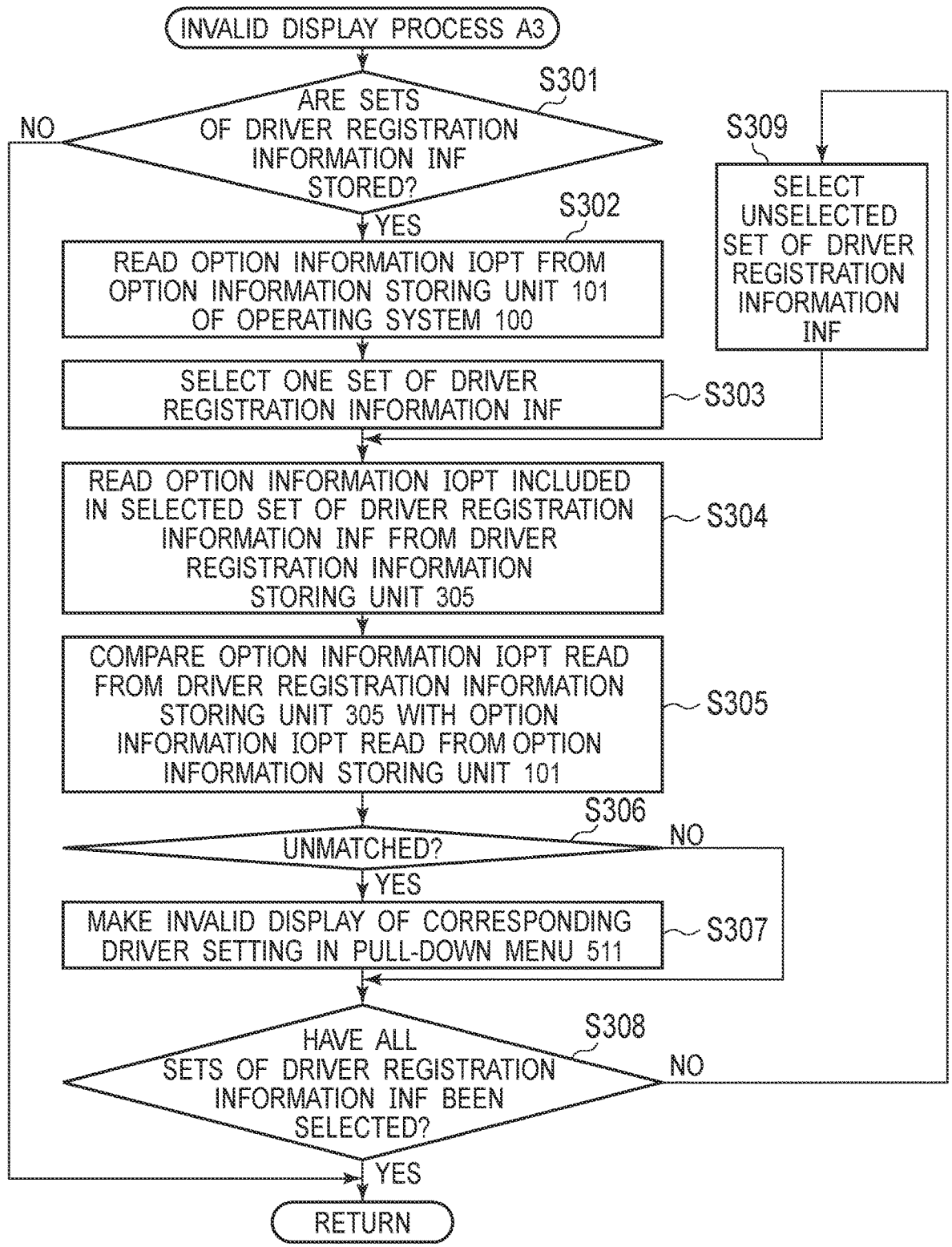
FIG. 19 is a flowchart illustrating an operation example of the image formation system according to a modification example.

FIG. 19 illustrates one example of a subroutine of the disabling display process A3.

Firstly, the driver registration information reading unit 307 checks whether the driver registration information storing unit 305 stores the driver registration information INF (Step S301). If the driver registration information storing unit 305 declines to store the driver registration information INF ("N" at Step S301), the subroutine of the disabling display process A3 is ended.

If the driver registration information storing unit 305 stores the driver registration information INF at Step S301 ("Y" at Step S302), the option information reading unit 304 reads the option information IOPT from the option information storing unit 101 of the operating system 100 (Step S302).

Next, the printer driver 300B selects one driver registration information INF, out of the driver registration information INF stored in the driver registration information storing unit 305 (Step S303).

Next, the driver registration information reading unit 307 reads the option information IOPT included in the selected driver registration information INF from the driver registration information storing unit 305 (Step S304).

Next, the option information comparing unit 308B compares the option information IOPT read from the driver registration information storing unit 305 at Step S304 with the option information IOPT read from the option information storing unit 101 at Step S302 (Step S305).

If the option information IOPT read from the driver registration information storing unit 305 at Step S304 and the option information IOPT read from the option information storing unit 101 at Step S302 match each other ("N" at Step S306), the process is proceeded to Step S308.

If the option information IOPT read from the driver registration information storing unit 305 at Step S304 and the option information IOPT read from the option information storing unit 101 at Step S302 are unmatched ("Y" at Step S306), the user interface unit 301 makes change of an indication form of driver setting corresponding to the selected driver registration information INF as "disable", in the driver setting list 511A in the pull-down menu 511, as illustrated in FIG. 20 (Step S307). In this example, the indication form of a driver setting assigned with the setting name "A" and the indication of a driver setting assigned with a setting name "B" are changed disabled. In the indication form of disabled condition, a background is darker to be grayed, for example. This makes the user to intuitively recognize possible driver settings that can be selected for actual print processing.

Next, the printer driver 300B checks whether all the driver registration information INF stored in the driver registration information storing unit 305 has been selected (Step S308). If all the driver registration information INF has not been selected ("N" at Step S308), the printer driver 300B selects not-yet-selected driver registration information INF (Step S309), and the process is proceeded to Step S304. The printer driver 300B then repeats the operations from Steps S304 to S309 until the printer driver 300B selects all the driver registration information INF.

If all the driver registration information INF is selected ("Y" at Step S308), the subroutine of the disabling display process A3 is ended.

As illustrated in FIG. 18, the user interface unit 301 then receives the operation by the user (Step S143). The operations subsequent to Step S143 are similar to those in the case of the abovementioned embodiment illustrated in FIG. 10.

Third Modification Example

In the above-mentioned embodiment, as explained in Steps S164 and S165 of FIG. 12, a notification that the selected driver setting itself cannot be used is applied when two sets of the option information IOPT are unmatched. However, an embodiment is not limited to this. Instead of this, a part of parameters in the selected driver setting may be used, for example. The following describes an image formation system 1C according to the present modification example in details.

The image formation system 1C is provided with a personal computer 10C. A printer driver 300C is installed on the personal computer 10C. The printer driver 300C includes the option information comparing unit 308A.

Figure 21:
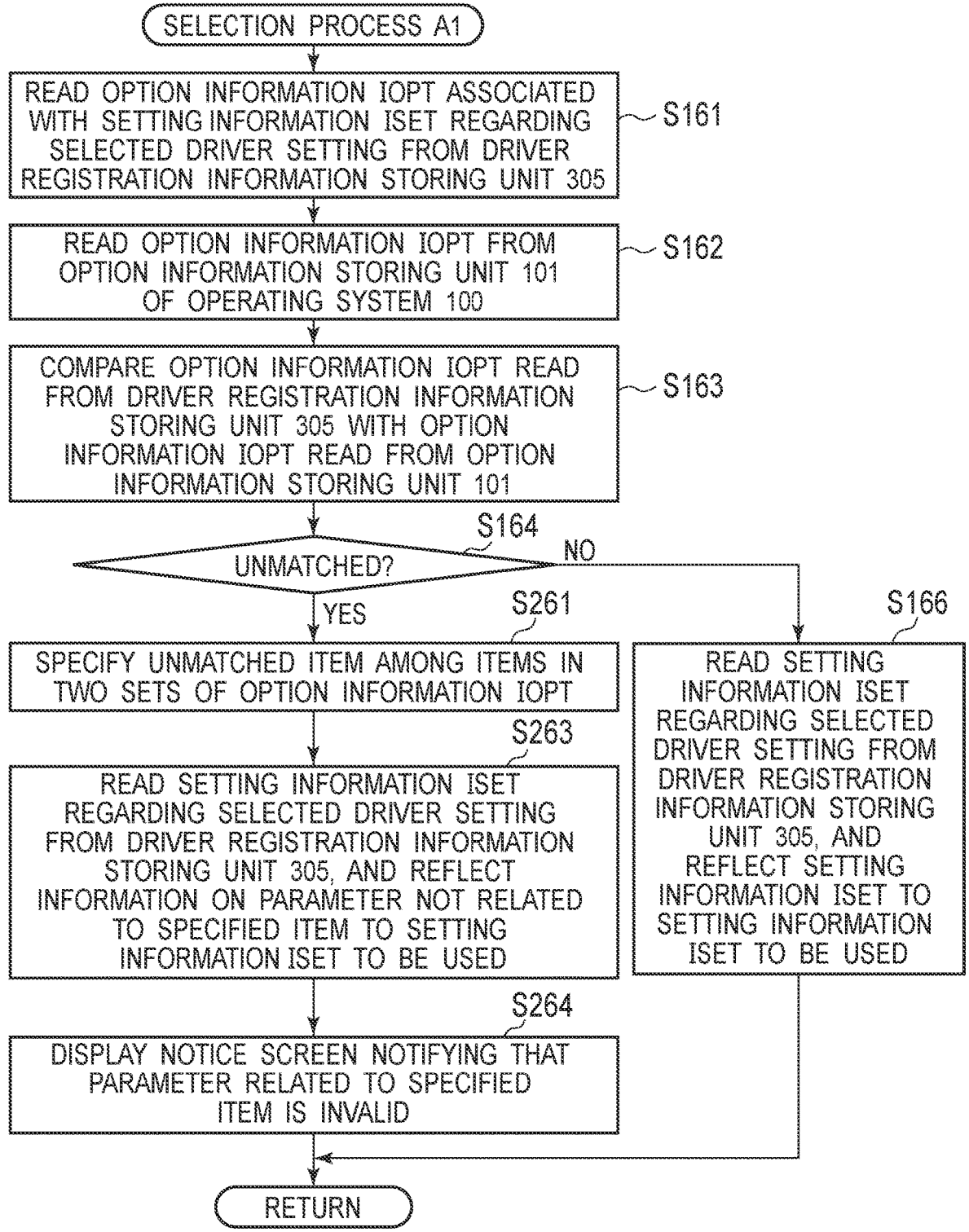
FIG. 21 is a flowchart illustrating an operation example of an image formation system according to a modification example.

FIG. 21 illustrates one example of the selection process A1 in the personal computer 10C. Steps S161 to S164 are the same as those in the case of the abovementioned embodiment illustrated in FIG. 12.

If the option information IOPT (in this example, the option information IOPTA) read from the driver registration information storing unit 305 at Step S161 and the option information IOPT read from the option information storing unit 101 at Step S162 are unmatched ("Y" at Step S164), the option information comparing unit 308A specifies at least one unmatched item among multiple items included in these two sets of the option information IOPT (Step S261).

Next, the driver registration information reading unit 307 reads the setting information ISET regarding the selected driver setting from the driver registration information storing unit 305, and the setting information reflection processing unit 310 reflects, to the setting information ISET as the actual setting to be used, information about the parameters not related to the item specified at Step S261 among multiple parameters included in the setting information ISET (Step S263). In other words, the setting information reflection processing unit 310 declines to reflect, the setting information ISET to be used, information about the parameter related to the item specified at Step S261 among the multiple parameters included in the setting information ISET. The user interface unit 301 then updates the information in the driver setting editing field 514 based on the setting information ISET to be used for actual print processing.

The user interface unit 301 then displays a warning screen notifying the caution that the parameter related to the item specified at Step S261 is invalid (Step S264).

Figure 22:
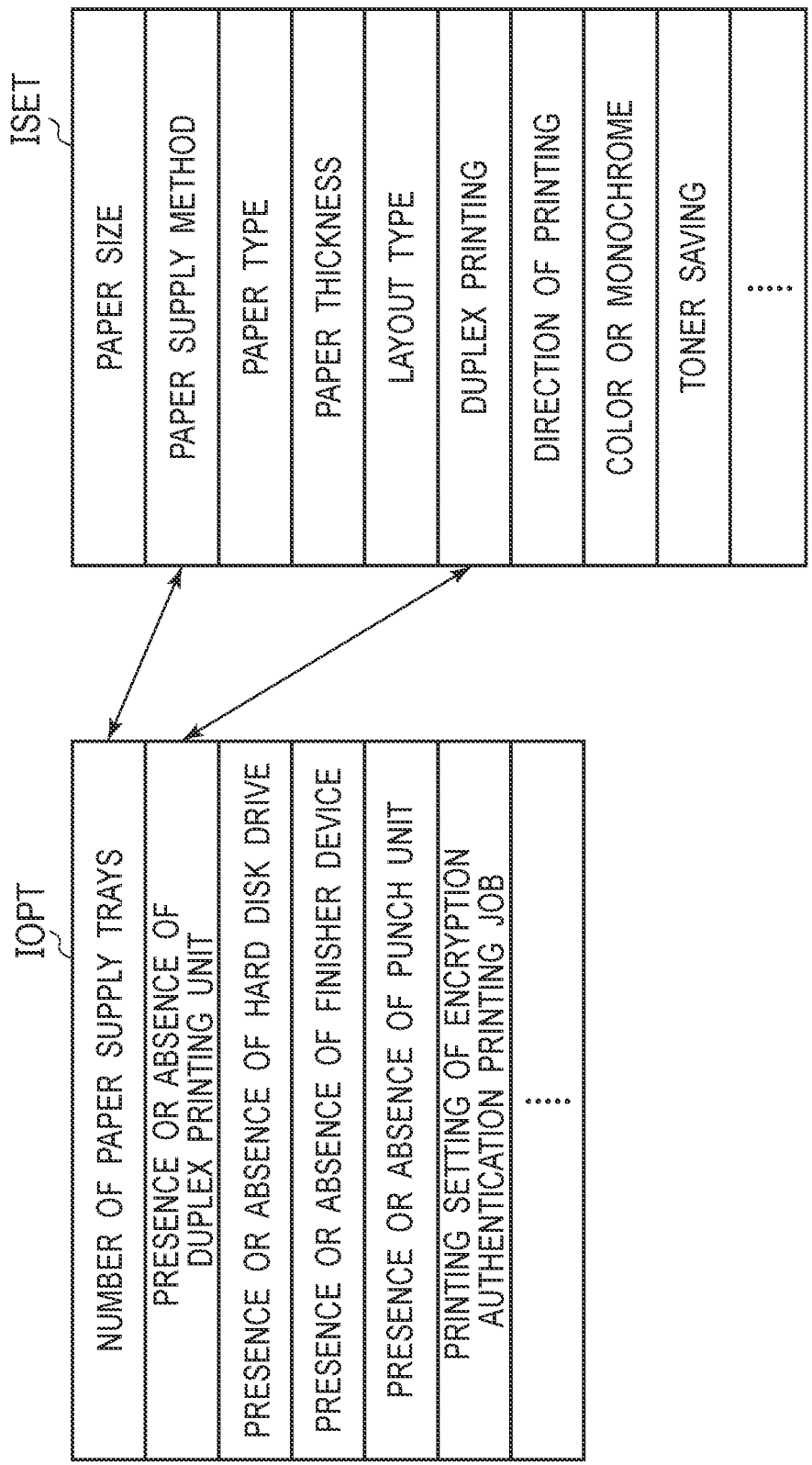
FIG. 22 is an explanation diagram illustrating a relation between multiple items included in the option information and multiple parameters included in the setting information.

FIG. 22 illustrates a relation between multiple items included in the option information IOPT and multiple parameters included in the setting information ISET. In this example, an item about the number of paper supply trays in the option information IOPT is related to information about the paper supply method in the setting information ISET. Moreover, information about availability of the duplex printing unit in the option information IOPT is related to information about the duplex printing in the setting information ISET.

For example, when the number of paper supply trays is changed in the option information IOPT, the option information comparing unit 308A specifies that the number of paper supply trays is changed (Step S261). With this, the setting information reflection processing unit 310 excludes the paper supply method that is related to the number of paper supply trays, and reflects the information about all the parameters except the paper supply method to the setting information ISET to be used (Step S263). The user interface unit 301 then displays the warning screen notifying the caution that the information about the paper supply method is invalid (Step S264). The setting of the paper supply method in the driver setting editing field 514 is identical with the setting before the driver setting is selected, for example.

Other Modification Example

Moreover, two or more modification examples among these modification examples may be combined.

Although the disclosure has been explained in the foregoing with the embodiment and some modification examples, the disclosure is not limited to the embodiment and others, and various modifications are possible.

For example, the option information IOPT illustrated in FIG. 3, the setting information ISET illustrated in FIG. 4, and the like in the abovementioned embodiment and others are examples, and may be changed as appropriate.

According to at least one of the abovementioned aspects, it is possible to enhance the convenience for the user.

The invention includes other embodiments in addition to the above-described embodiments without departing from the spirit of the disclosure. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the description.

The invention claimed is:

1. An information processing apparatus comprising:
    a storing unit being capable of storing therein one or more setting information each of which comprises a setting value for each of functions executable by an image formation apparatus for executing image formation processing in the image formation apparatus, wherein each setting information is associated with and stored with first apparatus information indicating a first configuration of the image formation apparatus composed of first functions that are executable by the image formation apparatus when the corresponding setting information is set, the storing unit further being capable of storing therein second apparatus information indicating a second configuration of the image formation apparatus, which is a latest configuration of the image formation apparatus composed of second functions that are executable by the image formation apparatus, that is acquired from the image formation apparatus for the last time; and
    a processing unit that, (i) in response to receiving an instruction to select one of the stored one or more setting information as an actual setting to be used for the image formation processing, compares the first apparatus information that is associated with the selected setting information and the second apparatus information, and (ii) in response to a new function being included in the second apparatus information and not being included in the first apparatus information that is associated with the selected setting information, displays a warning screen notifying that the new function has been added, to prompt to register new setting information for executing image formation processing.

2. The information processing apparatus according to claim 1, wherein
    upon receiving an instruction to store new setting information, the processing unit replaces the first apparatus information stored in the storing unit with the second apparatus information as a new first apparatus information, and thereby stores in the storing unit the new setting information and the new first apparatus information in association with the new setting information.

3. The information processing apparatus according to claim 1, wherein in response to the first apparatus information that is associated with the selected setting information and the second apparatus information matching each other, the processing unit reflects the selected setting information to the actual setting to be used.

4. The information processing apparatus according to claim 1, wherein in response to the first apparatus information that is associated with the selected setting information and the second apparatus information being unmatched, the processing unit declines to reflect the selected setting information to the actual setting to be used.

5. The information processing apparatus according to claim 4, wherein in response to the first apparatus information that is associated with the selected setting information and the second apparatus information being unmatched, the processing unit displays the warning screen further notifying that the selected setting information is not reflected to the actual setting to be used.

6. The information processing apparatus according to claim 1, wherein
    the processing unit generates a selection screen that prompts to select one of the one or more setting information, and
    in response to the first apparatus information that is associated with the selected setting information and the second apparatus information being unmatched, the processing unit changes a display form of the selected setting information in the selection screen.

7. The information processing apparatus according to claim 1, wherein
    in response to the first apparatus information that is associated with the selected setting information and the second apparatus information being unmatched, the processing unit specifies at least one unmatched function among the functions, reflects information of other functions in the setting information unrelated to the specified function to the actual setting to be used, and declines to reflect information of the at least one unmatched function in the setting information related to the specified function to the actual setting to be used.

8. The information processing apparatus according to claim 1, wherein the processing unit instructs the image formation apparatus to perform the image formation processing based on the actual setting to be used.

9. The information processing apparatus according to claim 1, further comprising a communication interface being communicable with the image formation apparatus.

10. The information processing apparatus according to claim 1, wherein
    the storing unit includes a first storing unit capable of storing therein the one or more setting information and the first apparatus information associated with each other and a second storing unit capable of storing therein the second apparatus information.

11. The information processing apparatus according to claim 10, wherein
the first storing unit comprises a hard drive and the second storing unit comprises a registry in an operation system of the information processing apparatus.

12. An information processing method, comprising:
storing in a storing unit one or more setting information, each of which comprises a setting value for each of functions executable by an image formation apparatus for executing image formation processing in the image formation apparatus, wherein each setting information is associated with and stored with first apparatus information indicating a first configuration of the image formation apparatus composed of first functions that are executable by the image formation apparatus when the corresponding setting information is set;
storing second apparatus information indicating a second configuration of the image formation apparatus, which is a latest configuration of the image formation apparatus composed of second functions that are executable by the image formation apparatus, that is acquired from the image formation apparatus for the last time;
comparing, in response to receiving an instruction to select one of the stored one or more setting information as an actual setting to be used for the image formation processing, the first apparatus information that is associated with the selected setting information and the second apparatus information; and
displaying, in response to a new function being included in the second apparatus information and not being included in the first apparatus information that is associated with the selected setting information, a warning screen notifying that the new function has been added, to prompt to register new setting information for executing image formation processing.

13. A non-transitory computer-readable storage medium that stores a program of a printer driver, the program executed by a processor to cause the processor to perform operation comprising:
storing in a storing unit one or more setting information, each of which comprises a setting value for each of functions executable by an image formation apparatus for executing image formation processing in the image formation apparatus, wherein each setting information is associated with and stored with first apparatus information indicating a first configuration of the image formation apparatus composed of first functions that are executable by the image formation apparatus when the corresponding setting information is set;
storing second apparatus information indicating a second configuration of the image formation apparatus, which is a latest configuration of the image formation apparatus composed of second functions that are executable by the image formation apparatus, that is acquired from the image formation apparatus for the last time;
comparing, in response to receiving an instruction to select one of the stored one or more setting information as an actual setting to be used for the image formation processing, the first apparatus information that is associated with the selected setting information and the second apparatus information; and
displaying, in response to a new function being included in the second apparatus information and not being included in the first apparatus information that is associated with the selected setting information, a warning screen notifying that the new function has been added, to prompt to register new setting information for executing image formation processing.

* * * * *